(12) United States Patent
Yuen et al.

(10) Patent No.: US 6,477,705 B1
(45) Date of Patent: *Nov. 5, 2002

(54) METHOD AND APPARATUS FOR TRANSMITTING, STORING, AND PROCESSING ELECTRONIC PROGRAM GUIDE DATA FOR ON-SCREEN DISPLAY

(75) Inventors: Henry C. Yuen, Redondo Beach, CA (US); Roy J. Mankovitz, Encino, CA (US); Daniel S. Kwoh, Flintridge, CA (US); Elsie Y. Leung, South Pasadena, CA (US)

(73) Assignee: Gemstar Development Corporation, Pasadena, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/744,399

(22) Filed: Nov. 7, 1996

Related U.S. Application Data

(63) Continuation-in-part of application No. PCT/US95/11173, filed on Aug. 31, 1995, and a continuation-in-part of application No. 08/475,395, filed on Jun. 7, 1995, now Pat. No. 6,239,794, which is a continuation-in-part of application No. 08/424,863, filed on Apr. 17, 1995, now abandoned, which is a continuation-in-part of application No. 08/369,522, filed on Jan. 5, 1995, now abandoned, which is a continuation-in-part of application No. 08/312,863, filed on Sep. 27, 1994, now abandoned, which is a continuation-in-part of application No. 08/298,997, filed on Aug. 31, 1994, now abandoned.

(51) Int. Cl.[7] ........................ H04N 7/173; H04N 5/50

(52) U.S. Cl. ...................... 725/41; 725/43; 725/52; 348/565; 348/906

(58) Field of Search ..................... 345/327; 348/10, 348/563, 564, 565, 906, 731–738; H04N 5/44, 5/445

(56) References Cited

U.S. PATENT DOCUMENTS

| 3,891,792 A | 6/1975 | Kimura .................... 178/5.8 R |
| 4,691,351 A | 9/1987 | Hayashi et al. ............... 380/10 |

(List continued on next page.)

FOREIGN PATENT DOCUMENTS

| EP | 444496 | 9/1991 |
| EP | 447968 | 9/1991 |

(List continued on next page.)

OTHER PUBLICATIONS

James Sorce, Designing a Broadband Residential Entertainment Service: A Case Study, 13th International Symposium Human Factors in Telecommunications, Torino, Italy, Sep. 10–14, 1990.*

(List continued on next page.)

Primary Examiner—Andrew Faile
Assistant Examiner—Reuben M. Brown
(74) Attorney, Agent, or Firm—Christie, Parker & Hale, LLP

(57) ABSTRACT

A television viewer uses a PIP format for display of program related information such as television program listings from a program schedule data base in the background and moving, real time images of a program selected from the displayed listings in the PIP window. All the text of the background information lies outside the PIP window. In one embodiment, as the viewer selects a particular program from the display of current television program listings by means of a cursor or a code number, the corresponding program automatically appears in the PIP window.

65 Claims, 25 Drawing Sheets

U.S. PATENT DOCUMENTS

| | | | |
|---|---|---|---|
| 4,706,121 A | 11/1987 | Young | |
| 4,729,027 A | 3/1988 | Hakamada et al. | 358/183 |
| 4,734,769 A | 3/1988 | Davis | 358/142 |
| 4,746,983 A | 5/1988 | Hakamada | 358/183 |
| 4,751,578 A | 6/1988 | Reiter et al. | 358/183 |
| 4,821,102 A | 4/1989 | Ichikawa et al. | 358/183 |
| 4,873,584 A | 10/1989 | Hashimoto | 358/335 |
| 4,890,168 A | 12/1989 | Inoue et al. | 358/335 |
| 4,908,707 A | 3/1990 | Kinghorn | 358/147 |
| 4,918,531 A | 4/1990 | Johnson | 358/183 |
| 4,954,882 A | 9/1990 | Kamemoto | 358/22 |
| 4,991,011 A | 2/1991 | Johnson et al. | 358/141 |
| 4,992,782 A | 2/1991 | Sakamoto et al. | 340/747 |
| 4,998,171 A | 3/1991 | Kim et al. | 358/183 |
| 5,027,400 A * | 6/1991 | Baji | |
| 5,038,211 A | 8/1991 | Hallenbeck | 358/142 |
| 5,040,067 A | 8/1991 | Yamazaki | 358/183 |
| 5,047,867 A | 9/1991 | Strubbe et al. | 358/335 |
| 5,109,279 A | 4/1992 | Ando | 358/147 |
| 5,146,335 A | 9/1992 | Kim et al. | 358/183 |
| 5,148,275 A | 9/1992 | Blatter et al. | 358/147 |
| 5,161,019 A | 11/1992 | Emanuel | 358/183 |
| 5,233,423 A | 8/1993 | Jernigan et al. | 358/181 |
| 5,237,417 A | 8/1993 | Hayashi et al. | 358/183 |
| 5,237,418 A | 8/1993 | Kaneko | 358/183 |
| 5,247,364 A | 9/1993 | Banker et al. | 358/191.1 |
| 5,253,066 A | 10/1993 | Vogel | 358/188 |
| 5,285,265 A | 2/1994 | Choi | 348/565 |
| 5,311,423 A | 5/1994 | Clark | 364/401 |
| 5,315,392 A | 5/1994 | Ishikawa et al. | 348/570 |
| 5,353,121 A | 10/1994 | Young et al. | 348/563 |
| 5,390,027 A | 2/1995 | Henmi et al. | |
| 5,434,625 A * | 7/1995 | Willis | |
| 5,453,146 A | 9/1995 | Duffield | |
| 5,453,746 A * | 9/1995 | Duffield | |
| 5,477,262 A | 12/1995 | Banker et al. | 348/7 |
| 5,485,221 A | 1/1996 | Banker et al. | 348/563 |
| 5,523,795 A * | 6/1996 | Marshall et al. | |
| 5,523,796 A * | 6/1996 | Marshall et al. | 348/589 |
| 5,528,304 A * | 6/1996 | Cherrick et al. | 348/565 |
| 5,532,754 A * | 7/1996 | Young et al. | 348/596 |
| 5,559,548 A | 9/1996 | Davis et al. | |
| 5,559,550 A * | 9/1996 | Mankovitz et al. | |
| 5,583,560 A * | 12/1996 | Florin et al. | 725/40 |
| 5,585,838 A | 12/1996 | Lawler et al. | 348/13 |
| 5,594,509 A * | 1/1997 | Florin et al. | 348/731 |
| 5,596,373 A * | 1/1997 | White et al. | 725/104 |
| 5,600,364 A | 2/1997 | Hendricks et al. | 348/1 |
| 5,635,978 A * | 6/1997 | Alten et al. | 725/42 |
| 5,731,844 A * | 3/1998 | Rauch et al. | 725/42 |

FOREIGN PATENT DOCUMENTS

| | | | |
|---|---|---|---|
| EP | 488379 | 6/1992 | |
| EP | 497235 | 8/1992 | |
| GB | 2217144 | 10/1989 | |
| JP | 178278 | 8/1991 | |
| JP | 44475 | 2/1992 | |
| WO | 95/01059 | * 1/1995 | H04N/7/16 |
| WO | 95/32583 | 11/1995 | |
| WO | 95/32585 | 11/1995 | |
| WO | 96/09721 | 3/1996 | |
| WO | 96/13935 | 5/1996 | |

OTHER PUBLICATIONS

Rundfunktechnische Mitteilungen, vol. 30, No. 1 Jan. 1986–Feb. 1986 Norderstedt (DE).

Symposium Record Cable Sessions, "Digital On–Screen Display A New Technology For The Consumer Interface," Publication date May 1993.

TV Guide On Screen Information Sheets.

RCA Satellite Receiver User's Manual.

Panasonic TX–33A1G Operating Instructions.

Prevue Networks, Inc. Promotional Materials.

VideoGuide User's Manual.

StarSight Operating Guide and Quick Reference.

SuperGuide On Screen Satellite Program Guide, User's Guide, Owner's Manual, and sales literature.

* cited by examiner

METHOD AND APPARATUS FOR TRANSMITTING, STORING, AND PROCESSING ELECTRONIC PROGRAM GUIDE DATA FOR ON-SCREEN DISPLAY

CROSS-REFERENCE TO RELATED APPLICATIONS

This application is a continuation-in-part of PCT international application Serial No. PCT/US95/11173 filed Aug. 31, 1995, now Publication No. WO 96/07270, published Mar. 7, 1996, which designates and elects the United States. This application is also a continuation-in-part of application Ser. No. 08/475,395, filed Jun. 7, 1995, issued as U.S. Pat. No. 6,239,794, May 29, 2001, which is a continuation-in-part of application Ser. No. 08/424,863, filed Apr. 17, 1995 and abandoned Jun. 9, 1995, which is a continuation-in-part of application Ser. No. 08/369,522, filed Jan. 5, 1995, and abandoned Jul. 13, 1995, which is a continuation-in-part of application Ser. No. 08/312,863, filed Sep. 27, 1994 and abandoned Feb. 7, 1995, which is a continuation-in-part of application Ser. No. 08/298,997, filed Aug. 31, 1994 and abandoned on Feb. 7, 1995. The disclosures of these applications are incorporated fully herein by reference.

BACKGROUND OF THE INVENTION

This invention relates to the field of television and, more particularly, to a method and apparatus for simultaneously displaying video programs and related text on a television screen.

For a number of years television receivers have been equipped with picture-in-picture (PIP) capability. In PIP format, the moving, real time images of one television channel are displayed on the background of the screen and the moving, real time images of another television channel are displayed in a PIP window overlaid on a small area of the background. Because two channels are simultaneously displayed by the television receiver, two tuners are required. The viewer enters the PIP mode by pressing a PIP key of his or her controller. Then, the viewer can change either the channel of the background or the channel of the PIP by resetting the appropriate tuner. To reverse the background and PIP images, the viewer simply presses a SWAP key. To collapse the PIP window, the viewer again presses the PIP key.

Television program guides help television viewers select programs to watch. Such television program guides list the available television programs by day of the week, time of day, channel, and program title. For many years television program guides have been published in hard copy form. More recently, as illustrated by Levine Patent U.S. Pat. No. 4,908,713, television program guides have begun to take an electronic form. In other words, the schedule of program listings is stored in an electronic memory connected to the television receiver. The program listings are recalled from memory by the viewer on command for display on the television screen.

Despite the prevalence of television program guides, many viewers still make their program selections by switching the television tuner from channel to channel and observing on the screen what program is being received on the respective channels. This process is sometimes called "grazing."

Emanuel Patent U.S. Pat. No. 5,161,019 discloses an automated form of channel grazing. A preselected group of channels are sequentially scanned by switching the tuner of the television receiver from channel to channel. A still image of the program received on each channel is stored in a memory. After all the channels have been scanned, the still images from all the channels are simultaneously displayed on the television screen. This process gives the viewer more information about the program choices in addition to that obtainable from a television program guide, namely, the displayed still images of the actual programs.

SUMMARY OF THE INVENTION

According to the invention, the moving images of a television program are displayed in a PIP window on the screen of a television monitor and textual information related to the television program is displayed in the background on the screen. Preferably, the audio portion of the television program displayed in the PIP window is also reproduced by the sound system of the television monitor. The textual information is arranged on the screen so none of it is covered by the moving images.

In one embodiment, the textual program related information is a television program schedule. One of the program listings of the schedule identifies by title and time and/or channel the television program in the PIP window, which comprises moving images.

To facilitate channel grazing, a television viewer can use a PIP format for display of current television program listings from a program schedule data base in the background and moving, real time images of a program selected from the displayed listings in the PIP window. Specifically, as the viewer selects a particular program from the displayed current television program listings by means of a cursor or a code number, the corresponding program automatically appears in the PIP window. In this way, the viewer can channel graze by sequentially selecting the individual program listings in the background. When the viewer finds a program that the viewer wishes to watch, the viewer leaves the PIP format and returns to full screen television viewing, the tuner already being set to the desired program. To do this the viewer can reverse the background and PIP window and then collapse the window, leaving the desired program on the full screen or the apparatus can be configured to return to full screen viewing in a single step.

To permit the viewing of programs scheduled for future broadcast without losing sight of the current program being watched, a television viewer can use a PIP format for display of television program listings for a specific channel or a specific time from a program schedule data base in the background and moving, real time images of the current program on that channel in the PIP window. Specifically, as the viewer changes channels, the current program on that channel automatically appears in the PIP window. Alternatively, the programs scheduled for future broadcast can be formatted by category. The viewer can control the background to display program listings for a period of days, e.g. a week, in the future. In this way, the viewer can continue to watch a television program while ascertaining the future programs on the channel to which the television tuner is set. When the viewer finds a program that the viewer wishes to watch, the background disappears, leaving the program on the channel to which the tuner is set on the full screen.

BRIEF DESCRIPTION OF THE DRAWINGS

These and other features, aspects, and advantages of the present invention will become better understood with regard to the following description, appended claims, and accompanying drawings where:

DETAILED DESCRIPTION OF A SPECIFIC EMBODIMENT

Figure 1:
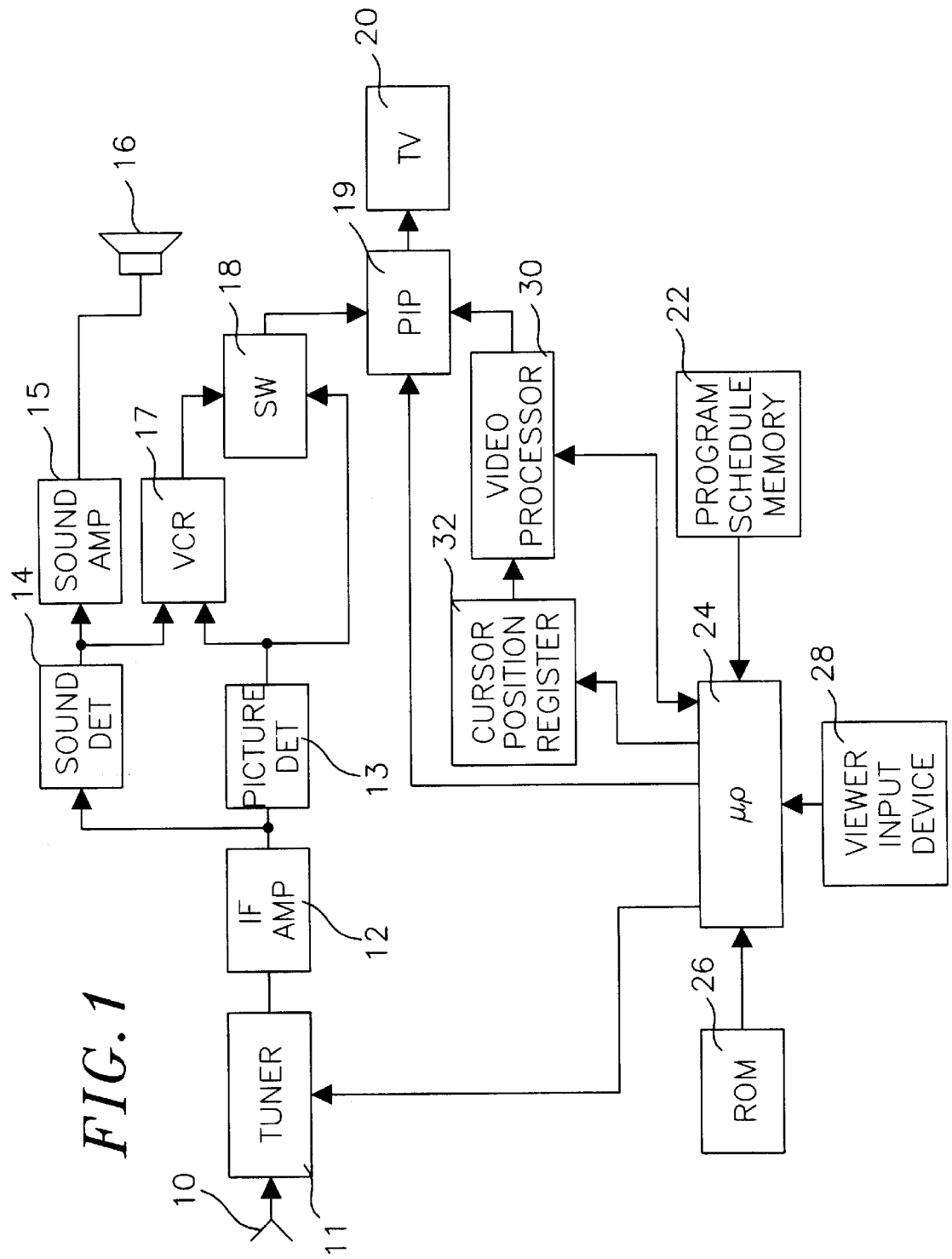
FIG. 1 is a schematic block diagram of a television receiver that has an electronic television program guide incorporating the principles of one embodiment of the invention.

In the following description of the embodiments of the invention, common reference numerals are used to represent the same components. In a preferred embodiment, the invention provides an interactive electronic program guide to the viewer. At any time during the viewing of a television program, the viewer may enter the electronic program guide. Once entered, the moving images of the currently broadcast television program are displayed in real time in a PIP window. The remainder of the screen is dedicated to displaying information about television program schedules and content in a tripartite format.

With reference to FIG. 1, a source of television signals 10 such as a terrestrial antenna, or a cable is connected to a television tuner 11. The output of tuner 11 is a modulated intermediate frequency signal containing video and audio television information. The tuner 11 is connected by an intermediate frequency amplifier (IF AMP) 12 to a picture detector (PICTURE DET) 13 and a sound detector (SOUND DET) 14, which produce base band video and audio signals, respectively. The audio signal is coupled by a sound amplifier (SOUND AMP) 15 to a loudspeaker 16. The video signal is coupled by a video amplifier (not shown) to one input of a switch 18. The sound detector 14 and the picture detector 13 are connected to the audio and video inputs, respectively, of a video cassette recorder (VCR) 17. (Alternatively, television signal source 10 could be directly connected to the RF input of VCR 17, if its internal tuner and demodulating circuitry is to be utilized.) The output of VCR 17 is connected to the other input of the switch 18. The output of the switch 18 is connected to one input of a conventional picture-in-picture (PIP) integrated circuit chip 19. The output of the PIP chip 19 is connected to the video input of a television receiver or monitor (TV) 20 having a screen (not shown).

An updatable data base of the schedule of program listings of all the available channels for a prescribed period of time, e.g. a day or a week, is electronically stored in a program schedule memory 22. These program listings typically include for each program the title, a program description, the day of the week, the start time of the day, the program length, and the channel on which the program is transmitted and thus available for reception at source 10. In a preferred embodiment, the program information is updated daily. This allows last minute program guide changes from broadcasters providing a more accurate system than the traditional printed program guide that is issued daily or weekly. The data base can be updated by a continuous data link in the vertical blanking interval (VBI) of one television channel broadcast to the television receiver in well known fashion. Alternatively, the data base can be updated by unplugging memory 22 and replacing it with a memory having the updated data base. The memory 22 is connected to a microprocessor 24 that is programmed to control the operation of the described equipment. An operating program for the microprocessor 24 is stored in a read only memory (ROM) 26. A viewer input device 28, preferably in the form of a remote infrared (IR) controller, is coupled to microprocessor 24 to provide commands from the viewer. A video processor 30 is coupled to the microprocessor 24. When the viewer wishes to see television program listings, the microprocessor 24 recalls a portion of the program schedule data base from memory 22 and couples it to the video processor 30, where the program listings are formatted for display. Preferably, the information stored in video processor 30 is a bit map of what is displayed on the screen of television receiver 20. The video processor 30 is connected to the other input of the PIP chip 19. Preferably, viewer input device 28 controls the microprocessor 24 by cursor movement on the screen of television receiver 20. To this end, the microprocessor 24 and the video processor 30 are coupled to a cursor position register 32. (Alternatively, the viewer can select items of information displayed on the screen by keying into the viewer input device 28 code numbers assigned to these items.) The microprocessor 24 is also coupled to the tuner 11 for channel change, to the VCR 17 for play/record selection and start/stop, to the switch 18 for selection of one of its inputs, and to the PIP chip 19 for selection of the PIP mode of operation.

Figure 2:
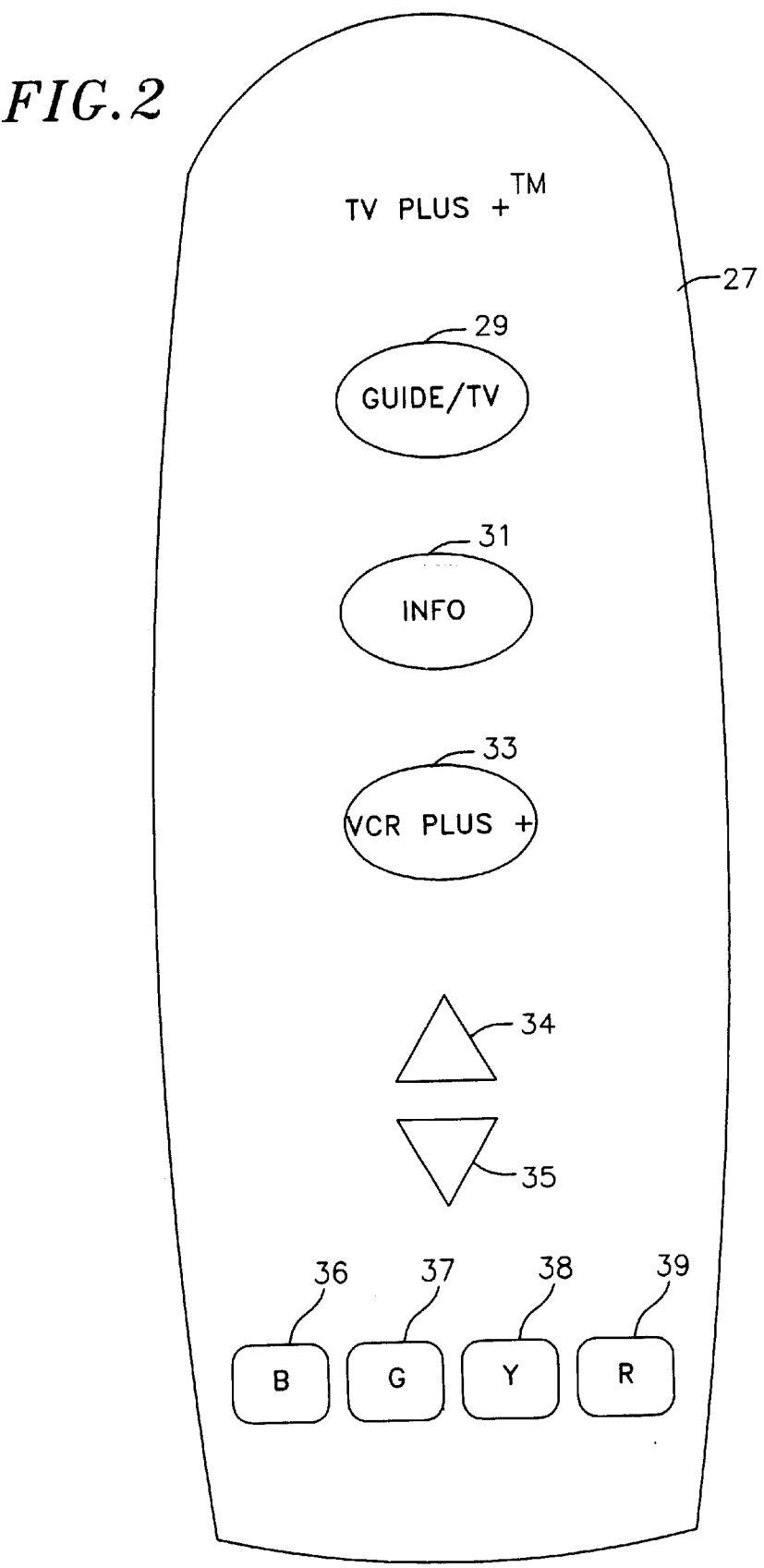
FIG. 2 is a top plan view of a remote controller for operating the electronic program guide of FIG. 1.

The viewer input device 28 preferably takes the form of a hand-held remote IR transmitter which communicates with an IR receiver connected to the microprocessor 24. As shown in FIG. 2, the IR transmitter has a housing 27 on which a number of control buttons are mounted. A GUIDE/TV button 29, an INFO button 31, and a VCR PLUS+ button 33 are located above up and down arrow buttons 34 and 35. A row of buttons 36, 37, 38 and 39 which are marked with the colors blue (B), green (G), yellow (Y), and red (R), respectively, underlie down arrow button 35.

Preferably, the user interface is fully menu driven. On-screen options are presented in color prompts on the television monitor which match the color buttons on the remote transmitter. Viewers can easily identify the on-screen options and make selections by a single touch on the corresponding color button on the remote transmitter.

The format of the electronic program guides are shown in FIGS. 3 to 7. Each format has a background area 40 and an overlaid PIP window 42 in the upper left-hand corner of the screen. The real time, i.e., 6:16 P.M., is displayed in a sub-area 42a of the PIP window 42. Background area 40 includes an area 43 at the top of the display for displaying on-screen options, a program description area 44 in the upper right-hand corner of the screen adjacent to the PIP window 42, and a program schedule area 46 below areas 42 and 44. Program schedule area 46 has a column for channel name or call letters, a column for channel number, and a column for program title; each line of area 46 represents a separate program listing. Program description area 44 includes the start time and length (duration) of the program being described. The viewer can move a cursor 48 vertically to highlight one of the program listings displayed in area 46. The program description, along with the start time and length, of the highlighted program listing displayed in area 46 appears in the program description area 44. The highlighted background of cursor 48 and the background of program description area 44 are the same color or shade. In each format, the complete, moving images of a currently broadcast television program in real time and the current time are displayed in the PIP window 42 and the audio portion of the television program displayed in the PIP window 42 is reproduced by the sound system. The information displayed in areas 43, 44, and 46 varies depending upon the format.

Figure 3:
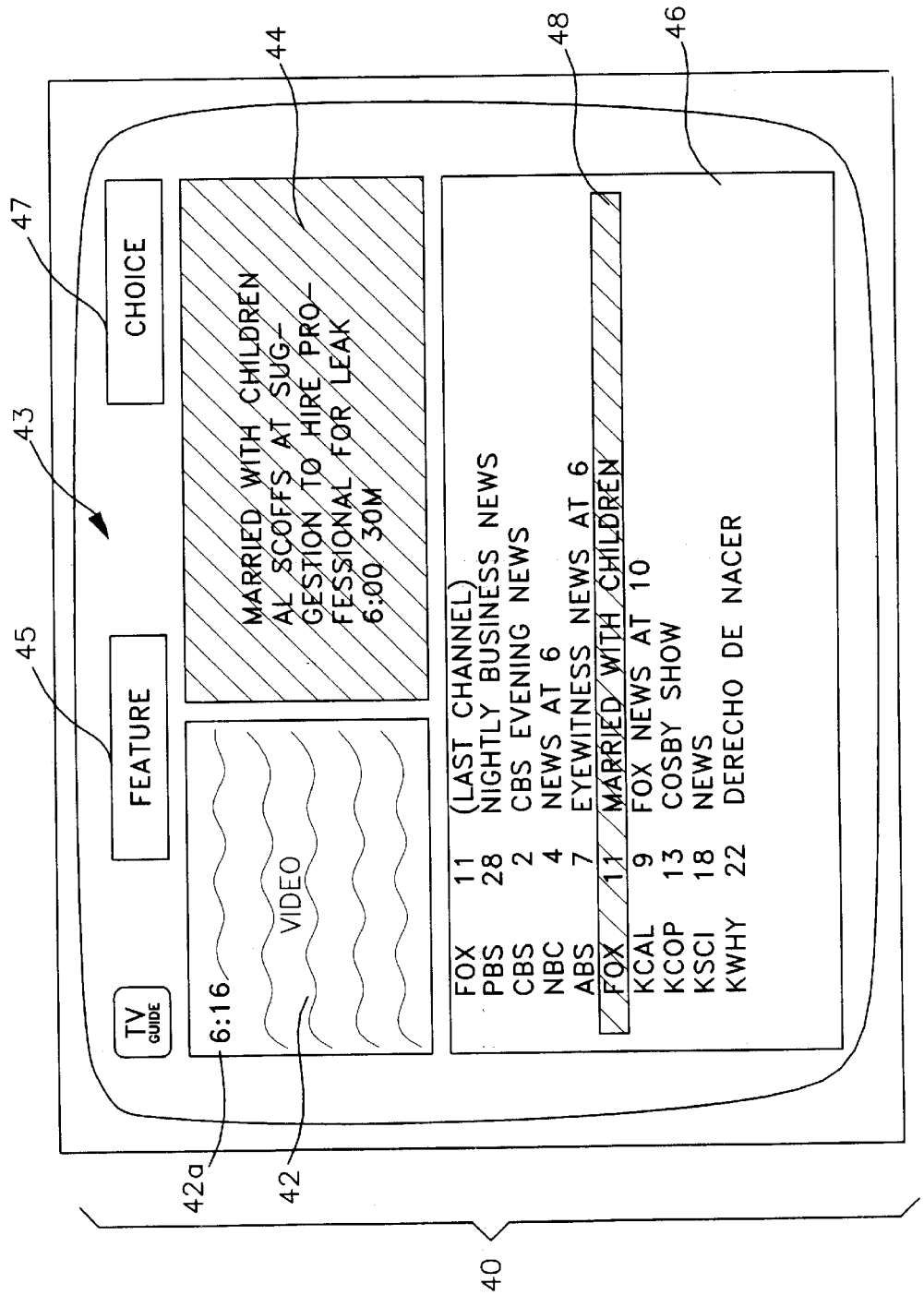
FIG. 3 is a television screen displaying a main menu formatted in accordance with the embodiment of FIG. 1.

The viewer may enter the electronic program guide from the normal television screen by selecting the GUIDE/TV button 29 on the remote transmitter. As a result, a main menu is displayed on the screen as shown in FIG. 3. The main menu displays program listings of television programs being broadcast at the current time. The moving, real time images of the current television program highlighted by the cursor 48 are displayed in the PIP window 42 and a brief program description of the highlighted program is displayed in area 44. As the viewer moves the cursor 48 vertically from program listing to program listing, the current television program displayed in the PIP window 42 and the program description displayed in area 44 automatically change accordingly to match the highlighted program in area 46. As the cursor moves from one program listing to another, the tuner 11 is set to the channel for the highlighted program listing so the program can be displayed in the PIP window 42, the microprocessor 24 recalls the program description for the highlighted listing from the program schedule memory 22, and the video processor 30 formats this program description so it can be displayed in area 44. Area 43 of the main menu provides on-screen options, by way of example, a green "FEATURE" prompt 45 and a red "CHOICE" prompt 47.

The last channel viewed in the television mode is displayed at the top of the program listings in area 46 to facilitate the return to full screen television viewing from the PIP format. Thus, the viewer need not recall the television program he or she was viewing before entering the electronic program. The viewer simply needs to position the cursor on the "last channel" listing at the top of area 46 before exiting the electronic program guide to continue viewing the television program previously viewed.

The "CHOICE" 47 on-screen option allows the viewer to enter into the individual electronic program guides. In a preferred embodiment, there are four basic electronic program guides which can be accessed through the "CHOICE" prompt 47, each allowing a viewer to access program information based on different sorting criteria. The four electronic program guides include a "SURF" guide which displays the programs currently broadcasted for each channel, a "NEXT" guide which displays the television programs for a selected channel, a "SCAN" guide which displays the television programs for each channel at selected times, and a "SORT" guide which displays the television programs by category.

Figure 4:
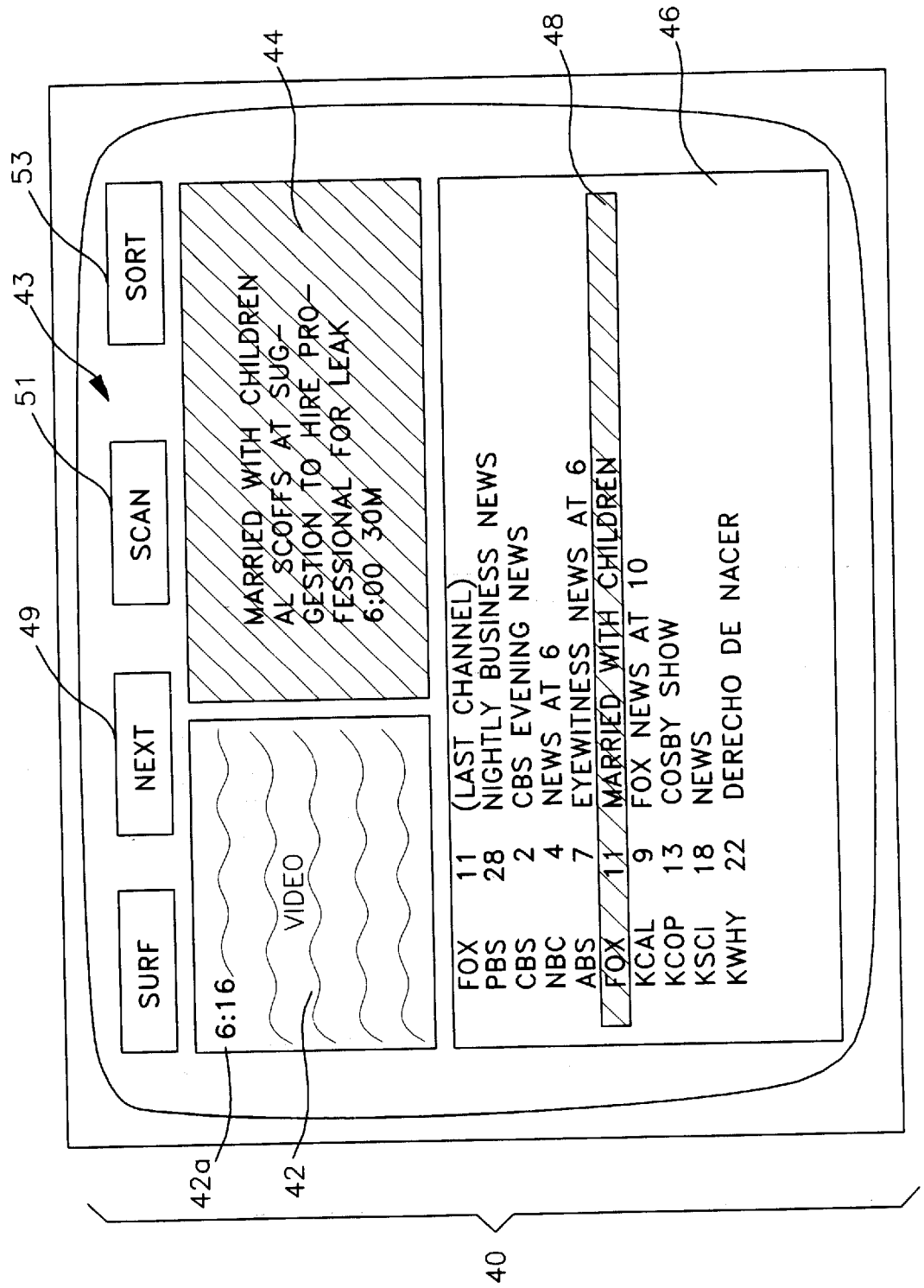
FIG. 4 is a television screen displaying a SURF guide formatted in accordance with the embodiment of FIG. 1.

By selecting the red "CHOICE" prompt from the main menu, the "SURF" guide screen is pulled up as shown in FIG. 4. The "SURF" guide screen is similar to the main menu in that it allows the viewer to display current television program listing information in the background and moving, real time images of a program selected from the displayed listings in the PIP window 42.

In program schedule memory 22, the program listings are coded by day of the week, time of day, and channel so that they can be accessed by the microprocessor 24 when necessary to supply program schedule information to the video processor 30 to compose the program listings and the program descriptions. The microprocessor 24 has a real time clock (not shown), the time of which is compared with the time of day and day of the week codes to select the program listings for the SURF guide. The functional storage areas of the cursor position register 32 are mapped to the storage areas of the video processor 30 where the program schedule is formatted for display on background area 40 so the cursor position register 32 points to the area of the screen, and thus the particular program, that is highlighted by the cursor 48. By comparing the cursor position in the register 32 with the channel corresponding to the highlighted area of the video processor 30, the channel of the highlighted program is derived and coupled to the microprocessor 24. The microprocessor 24 then sets the tuner 11 to this channel.

In the SURF guide, the microprocessor 24 recalls the appropriate program listings from memory 22 and transmits them to the video processor 30 where the program listings of area 46 and the program description of the highlighted program in area 44 are composed. At the same time, the microprocessor 24 operates the switch 18 so the output of the tuner 11 is directly connected to the one input of the PIP chip 19 and switches PIP chip 19 into a PIP mode, such that the input from the tuner 11 is displayed in the PIP window and the program schedule from the video processor 30 is displayed in the background. The microprocessor 24 senses the channel to which the tuner is set when the SURF guide is entered, and initially positions the cursor 48 at the program listing broadcast on this channel. As the viewer moves the up/down arrows of the cursor control key set, the tuner 11 is reset accordingly and new program schedule information is fed through the microprocessor 24 to the video processor 30 to recompose the program listings so the cursor 48 remains visible and the program description remains current. The described mode facilitates channel grazing by the viewer. When the viewer finds the video program he or she wishes to watch, the viewer leaves the electronic program guide. As a result, the microprocessor 24 switches the PIP chip 19 out of the PIP mode, such that the video program inputted from the tuner 11 is displayed full screen.

Figure 5:
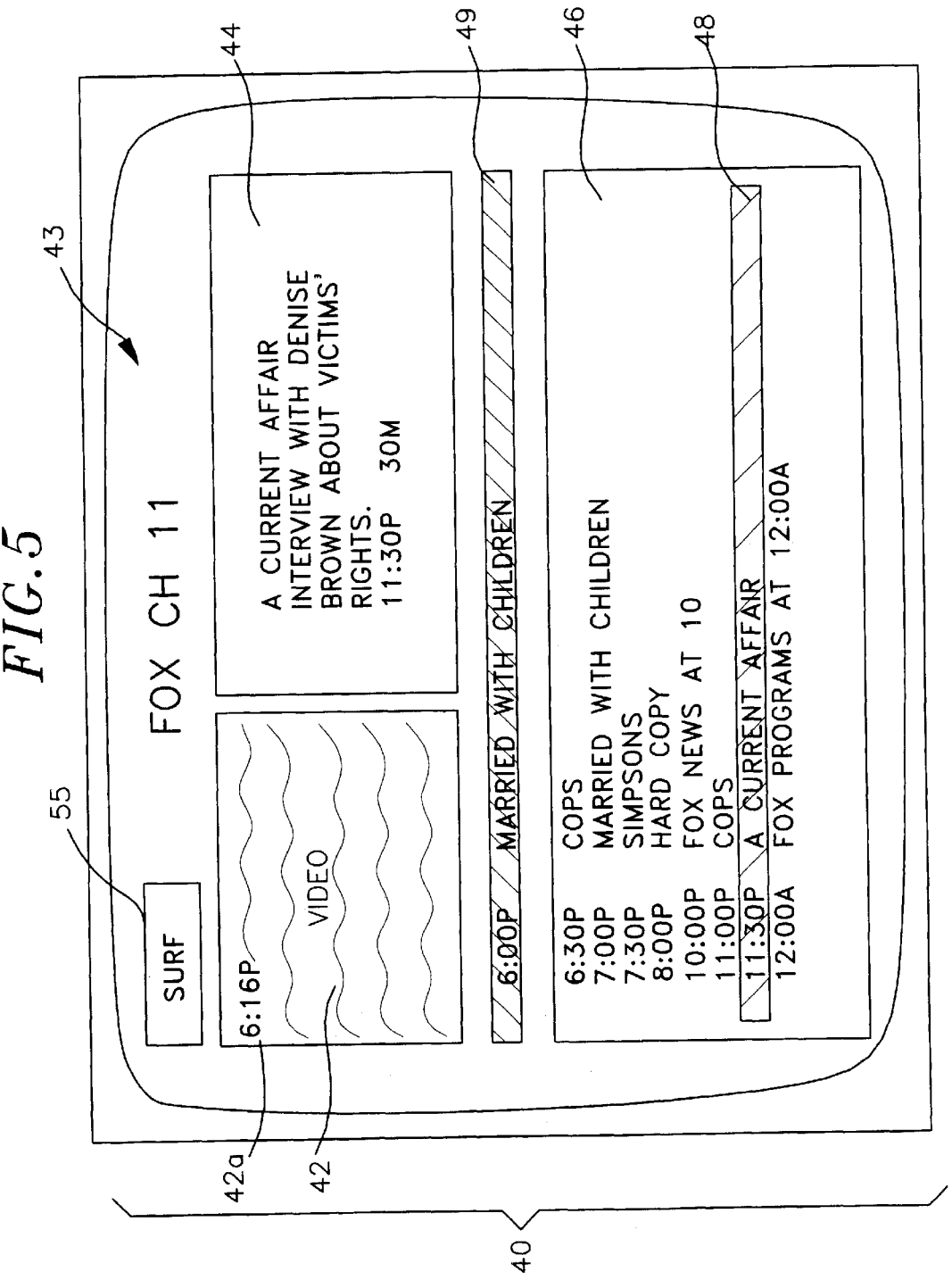
FIG. 5 is a television screen displaying a NEXT guide formatted in accordance with the embodiment of FIG. 1.

The viewer may enter any of the other program guides for the "SURF" guide screen. The on-screen options are located in area 43 and include a green "NEXT" prompt 49, a yellow "SCAN" prompt 51 and a red "SORT" prompt 53. In FIG. 5, a version of a screen format for the "NEXT" guide is shown. All the program listings for a selected channel, i.e., FOX Channel 11, are displayed in area 46, from the currently broadcast program into the future for a specified time period, e.g., 24 hours or until the end of the next day. Area 46 has a column for time and a column for program title; each line of area 46 represents a separate program listing. The moving, real time images of the current television program on the channel are displayed in the PIP window 42. If the cursor also highlights this program, a brief program description of that program is displayed in area 44. If the cursor highlights another program listing, as shown in FIG. 5, a brief program description of the highlighted program is displayed in area 44 and the current television program displayed in the PIP window 42 is identified in a banner 49 by time and title. The viewer may return to the SURF guide by selecting the blue SURF prompt 55 in area 43.

Figure 6:
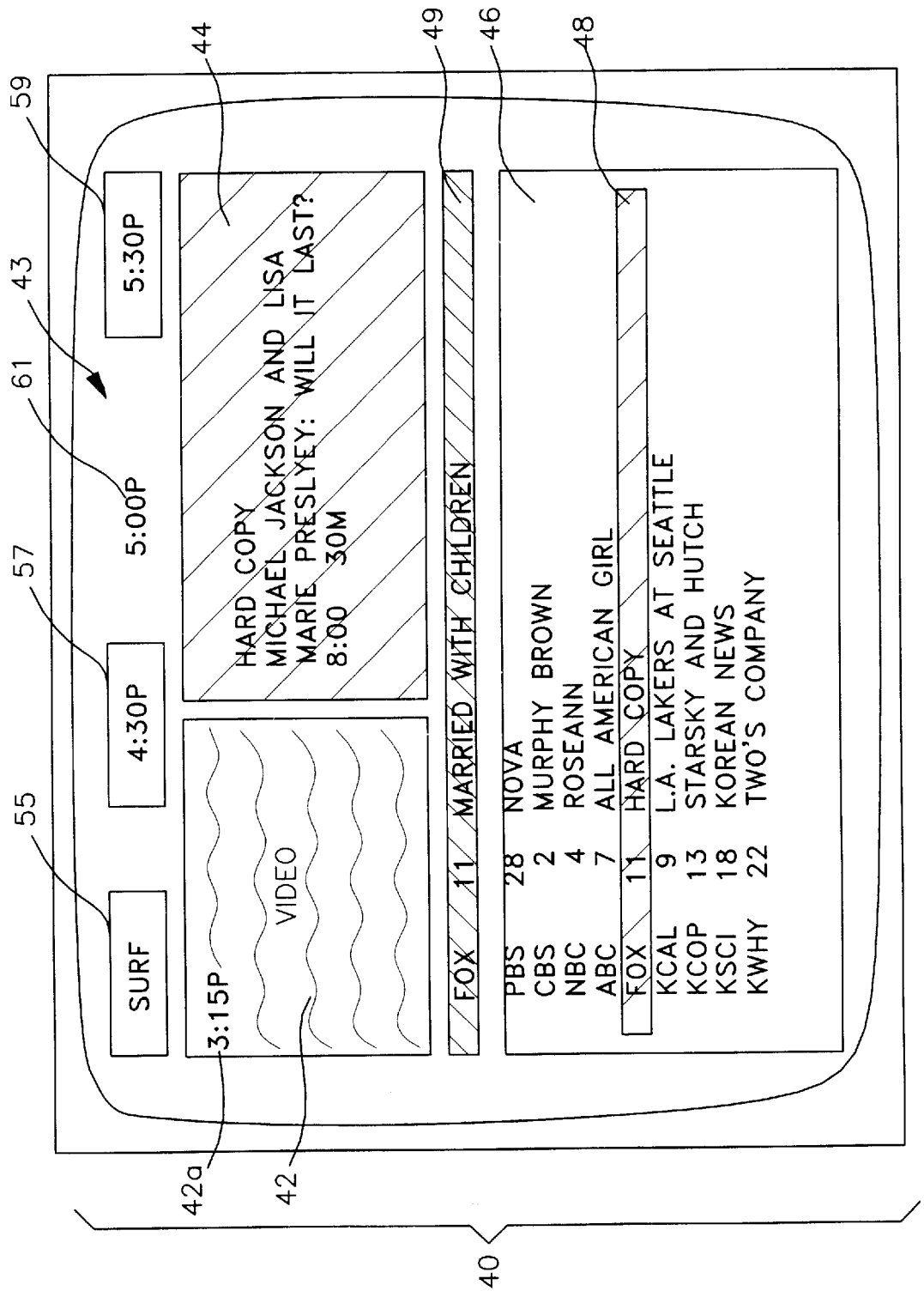
FIG. 6 is a television screen displaying a SCAN guide formatted in accordance with the embodiment of FIG. 1.

In FIG. 6, a version of a screen format for the "SCAN" guide is shown. From this menu, the viewer can select the future time of the program listings to be displayed at intervals such as one-half hour. The selected future time, i.e., 5:00 p.m., for the program listings displayed in area 46 is shown in area 43. A brief program description of the program listing highlighted in area 46 by the cursor 48 is displayed in area 44. The time slot of the SCAN guide can be incremented by one-half hour to 5:30 p.m. by selecting the red 5:30p prompt 59 in area 43. Conversely, the viewer can scan back one-half hour to 4:30 p.m. by selecting the green 4:30p prompt 57 in area 43. By way of example, if the television program schedule for 5:00 p.m. is currently displayed in area 46 and the viewer selects the green 4:30p prompt 57, the television program schedule for 4:30 p.m. will be displayed in area 46 and 4:30p will be displayed in sub-area 61 of area 43. The green on-screen prompt 57 will change to 4:00p and the red on-screen prompt 59 will change to 5:00p so that the viewer has the option of scanning forward or backward in time by one-half hour with a single touch of the corresponding colored button on the viewer input device 28.

The last program selected in the SURF guide always remains displayed in the PIP window 42 as the viewer navigates through the SCAN guide. The banner 49, which identifies the program presented in the PIP window 42 by channel name, channel number, and program title, is displayed between the PIP window 42 and area 46 on a background having a different color or shade than the cursor 48. The viewer may return to the SURF guide by selecting the blue SURF prompt 55 in area 43.

Figure 7:
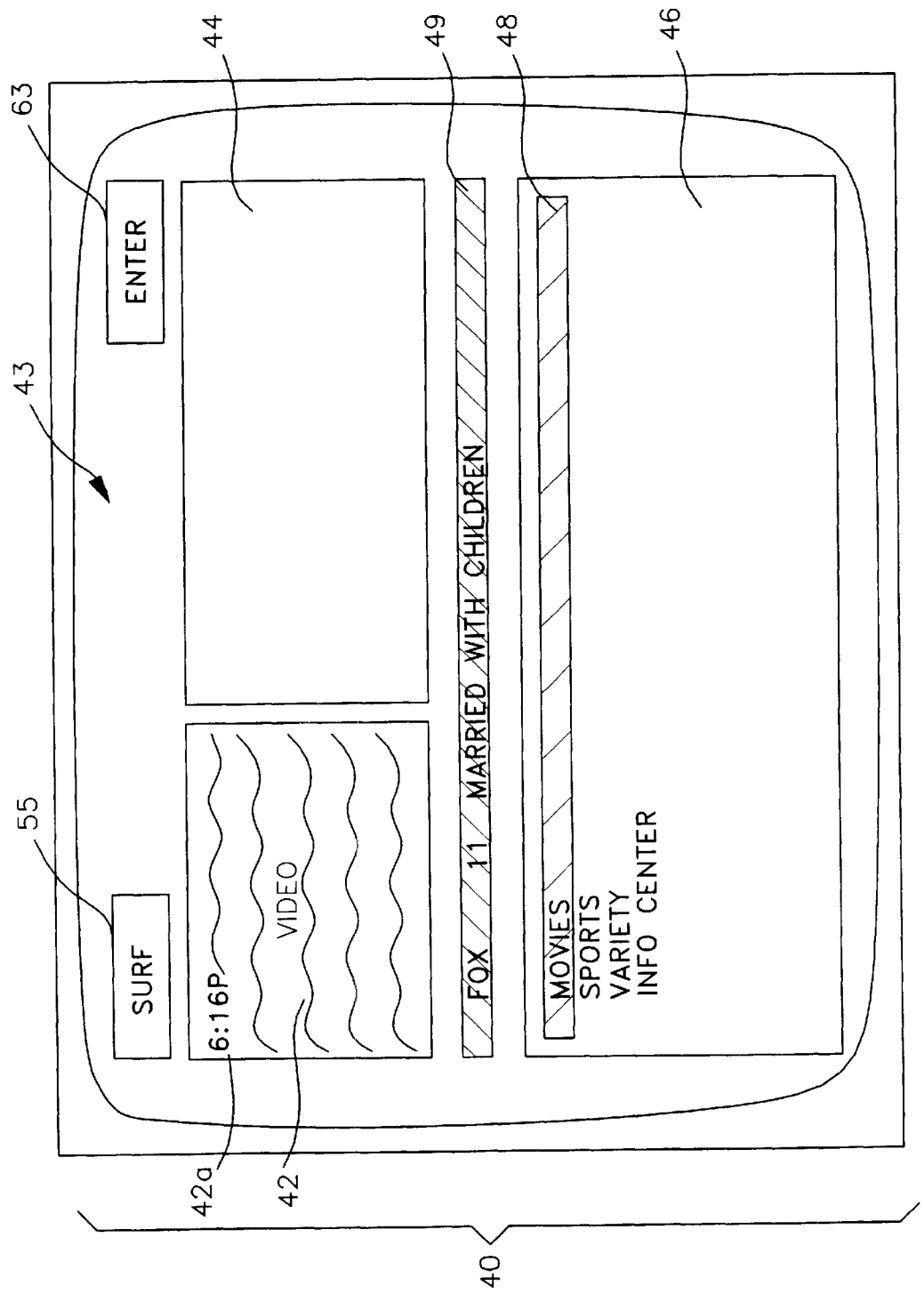
FIG. 7 is a television screen displaying a SORT guide formatted in accordance with the embodiment of FIG. 1.

In FIG. 7, a version of a screen format for the "SORT" guide is shown. A list of various categories, i.e., movies, sports, variety, are displayed in area 46. In a preferred embodiment, an informational database may also be accessed by selecting the INFO CENTER listing on the screen. Any of these categories, including INFO CENTER, can be highlighted by the cursor 48 and selected with the red ENTER prompt 63 in area 43. The last program selected in the SURF guide is displayed in the PIP window 42, and the banner 49 which identifies the program presented in the PIP window 42 by channel name, channel number, and program title is displayed between the PIP window 42 and area 46 on a background having a different color or shade than the cursor 48. The viewer may return to the SURF guide by selecting the blue SURF prompt 55 in area 43.

Figure 8:
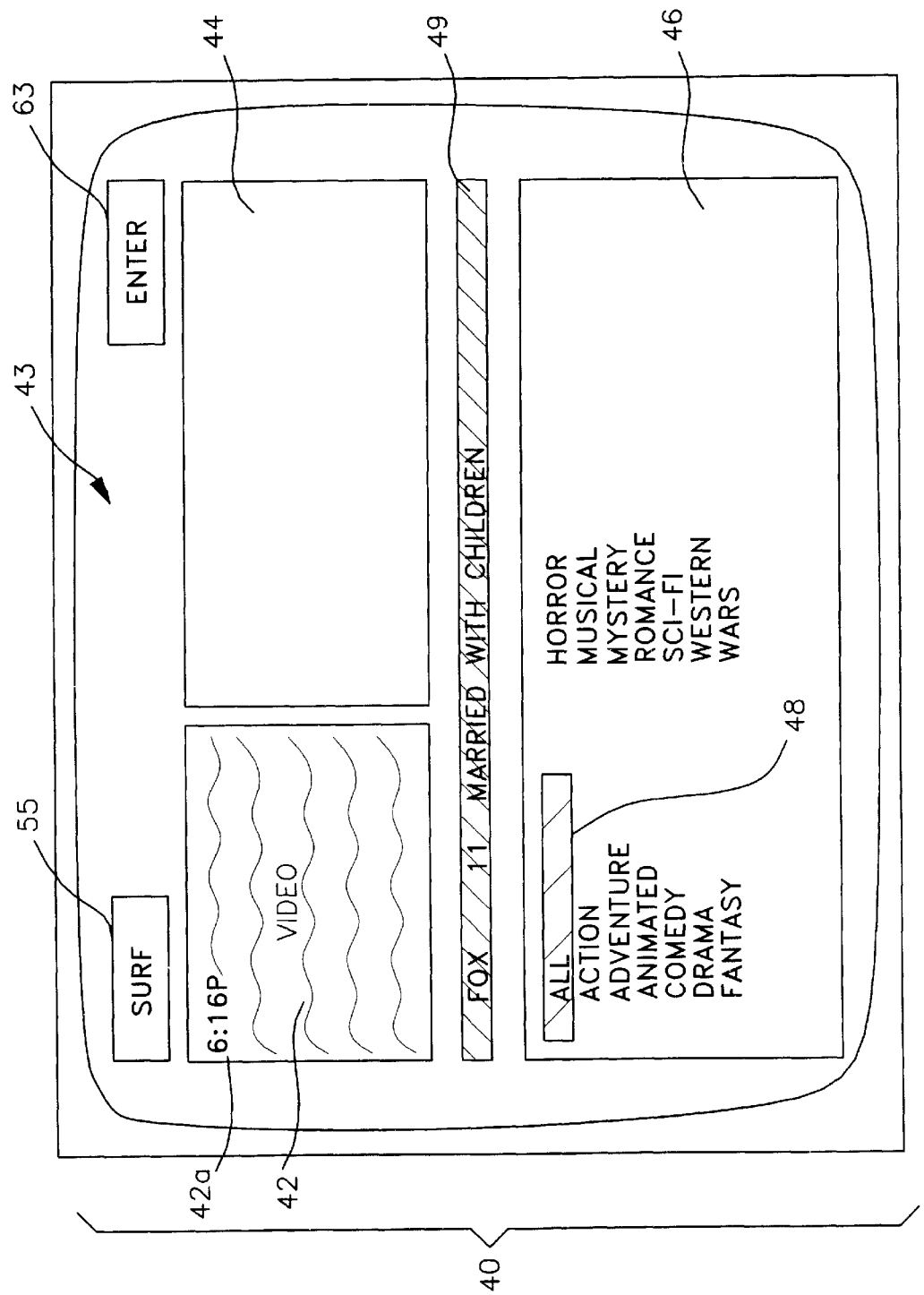
FIG. 8 is a television screen displaying a second level SORT guide formatted in accordance with the embodiment of FIG. 1.

Assuming that the viewer does not select INFO CENTER, once the highlighted category is entered by the viewer, various sub-categories are listed in area 46 as shown in FIG. 8. In a preferred embodiment, the cursor 48 is moved vertically through two columns of sub-category selections with the up and down arrow buttons of the viewer input device. Once the desired sub-category is highlighted, it may be entered by selecting the red ENTER prompt 63 in area 43. Alternatively, the microprocessor may be equipped with a horizontal cursor control responsive to a pair of left and right arrow buttons on the viewer input device. This approach allows the viewer to access a sub-category in a different column quicker and is particularly attractive when a multiple column format is implemented in area 46.

Figure 9:
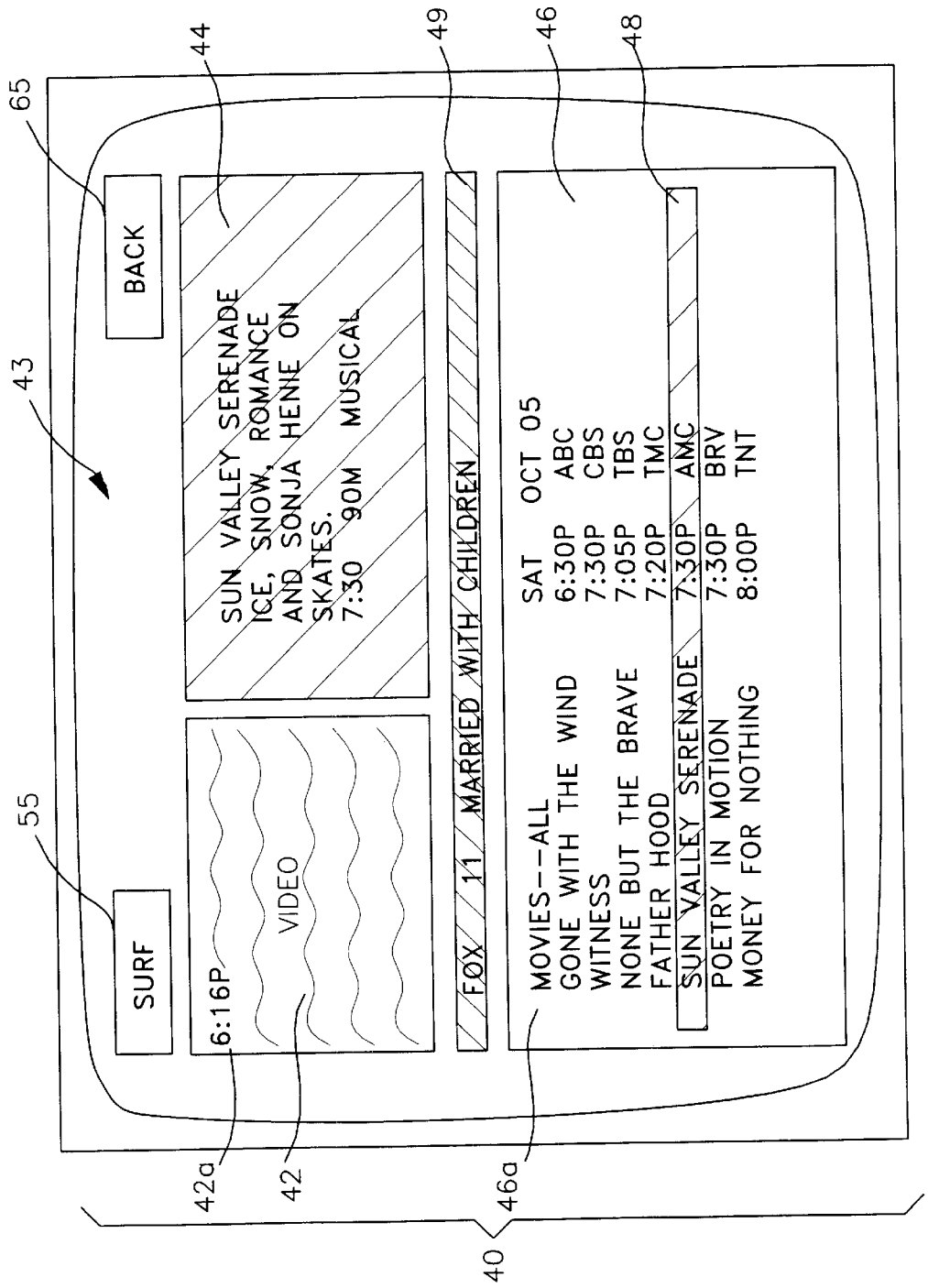
FIG. 9 is a television screen displaying a third level SORT guide formatted in accordance with the embodiment of FIG. 1.

In the described embodiment, the sub-category for ALL movies is highlighted, and the program guide depicted in FIG. 9 is presented to the screen once the ENTER prompt 63 is selected by the viewer. The program listings for the selected sub-category, i.e., MOVIES-ALL, are displayed in area 46, from the next or current broadcast program into the future for a specific time period, e.g., one week. Area 46 has a heading 46a that identifies the sub-category, day, and date, i.e., MOVIES-ALL SAT OCT 05, a column for titles, a column for start times, and a column for channel name or number; each line of area 46 represents a separate program listing. The moving, real time images of the last program selected from the SURF guide are displayed in the PIP window 42 and that program is identified in the banner 49 by channel name or number and title. A brief program description of the program highlighted by the cursor 48 is displayed in area 44.

From either the sub-category guide of FIG. 8 or the program listing guide for the selected sub-category of FIG. 9, the viewer may return to the SURF guide by selecting the blue SURF prompt 55 in area 43. Alternatively, the viewer may return directly to the sub-category guide directly from the corresponding program listing guide by selecting the red BACK prompt 65 in area 43.

Figure 10:
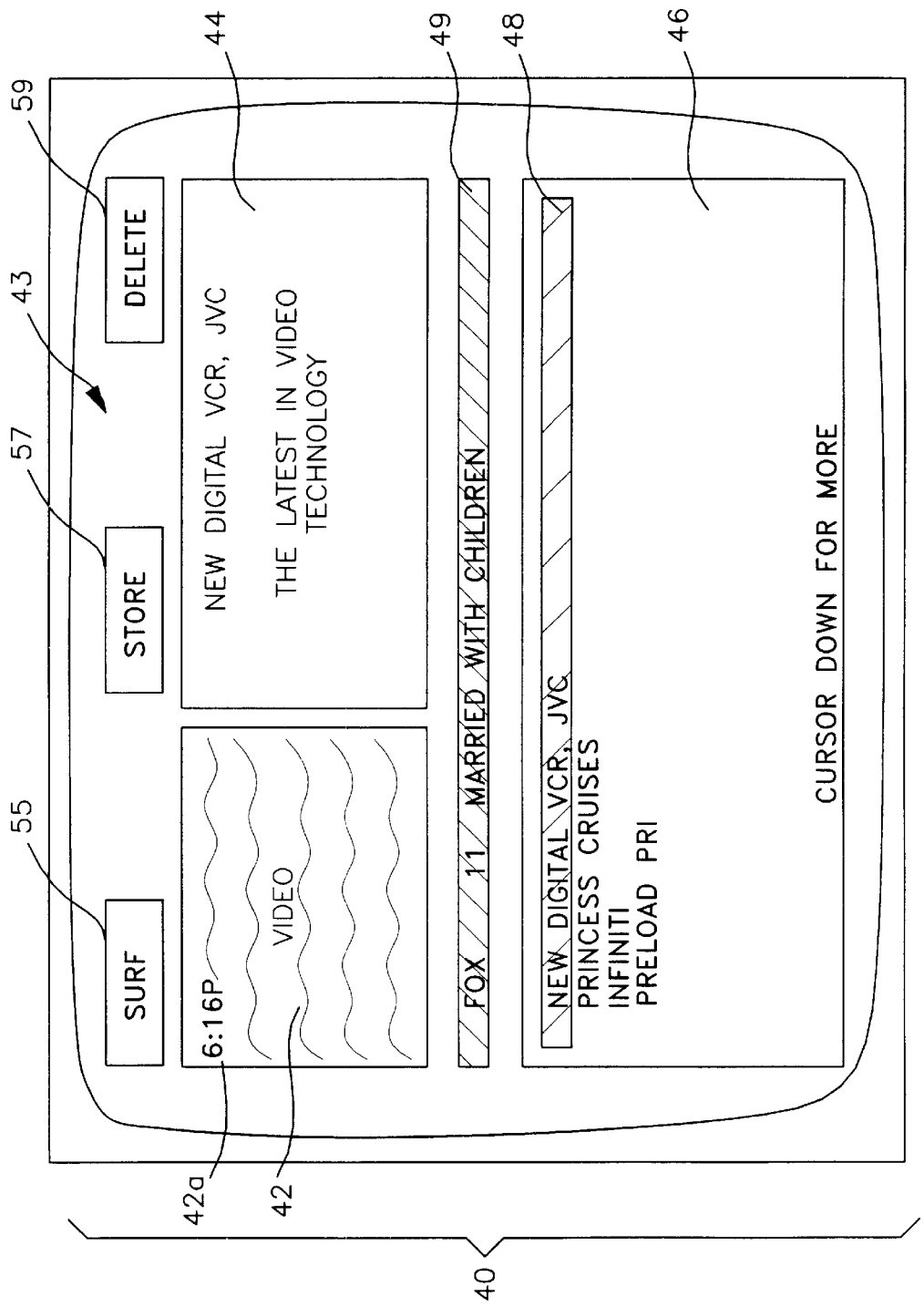
FIG. 10 is a television screen displaying a INFO CENTER screen formatted in accordance with the embodiment of FIG. 1.

Referring back to FIG. 7, the viewer may access an informational database by moving the cursor 48 downward vertically to highlight the INFO CENTER listing and selecting the red on-screen ENTER prompt 63 in area 43. This will cause an informational screen to be pulled up on the monitor as shown in FIG. 10. The previously viewed television program remains broadcast in the PIP window 42, and the banner 49 identifies that program by channel name, channel number, and program title. The viewer may return to the SURF guide by selecting the blue SURF prompt 55 in area 43.

Figure 11:
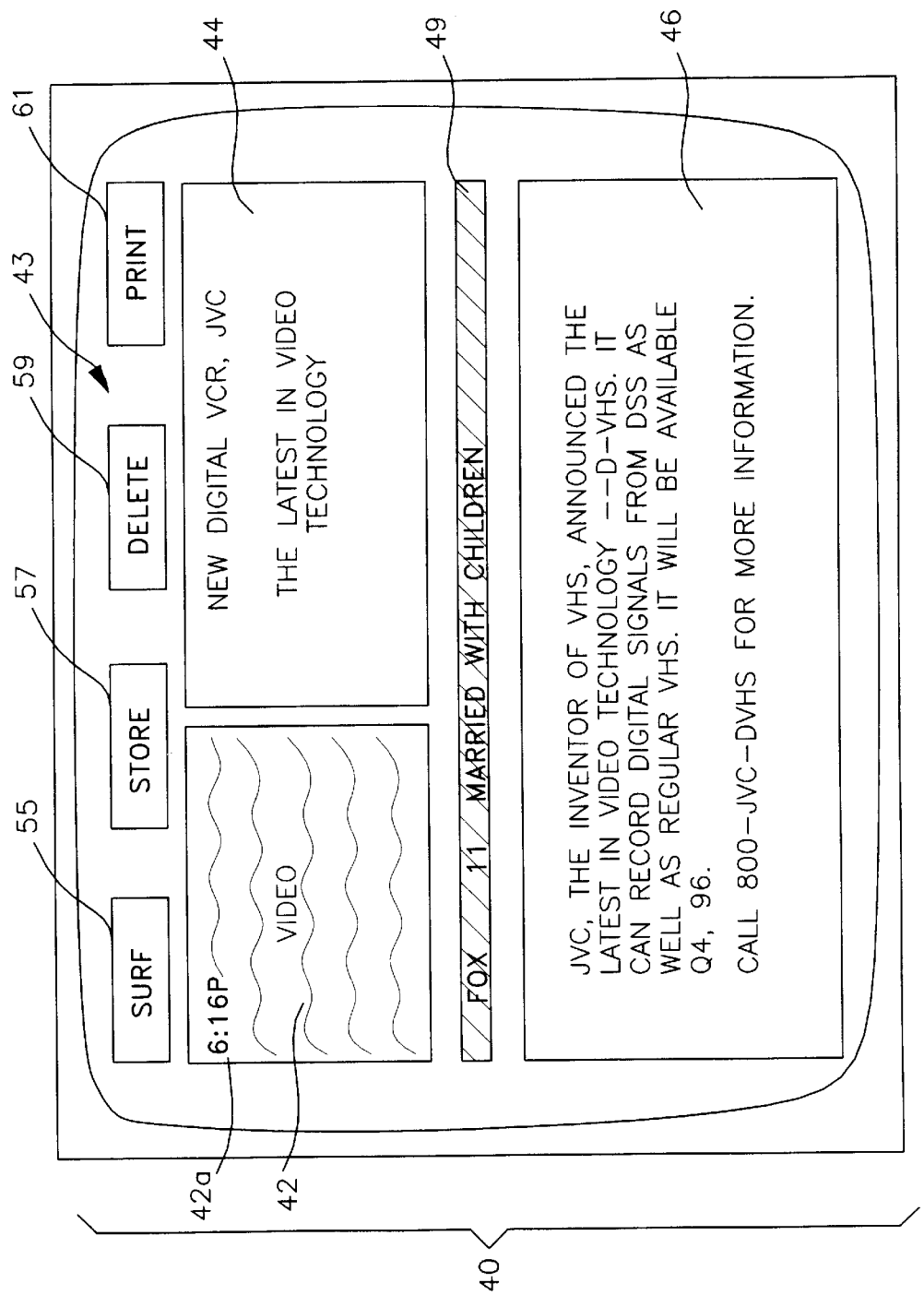
FIG. 11 is a television screen displaying a second level INFO CENTER screen formatted in accordance with the embodiment of FIG. 1.

A list of various informational topics are displayed in area 46. Any of the informational topics may be accessed by highlighting it with the cursor 48. A brief description of the informational topic highlighted is presented to the screen in area 44. The viewer may access the entire informational topic by selecting the INFO button on the viewer input device. By way of example, if the viewer selects "New Digital VCR, JVC" as the informational topic, the entire informational topic is displayed in area 46 as shown in FIG. 11. The viewer may use the cursor button on the viewer input device to advance to the next page or go back to the previous page if there is more than one page of data. The digital buttons (not shown) on the viewer input device may be used to directly access different pages if the data is organized in indexed pages. The information may also be printed to a hard copy by selecting the red on-screen PRINT prompt 61.

The message pertaining to the selected topic may be stored in memory or deleted from memory from either of the two INFO CENTER screens. This is accomplished by a yellow on-screen DELETE prompt 59 and a green on-screen STORE prompt 57.

Figure 12:
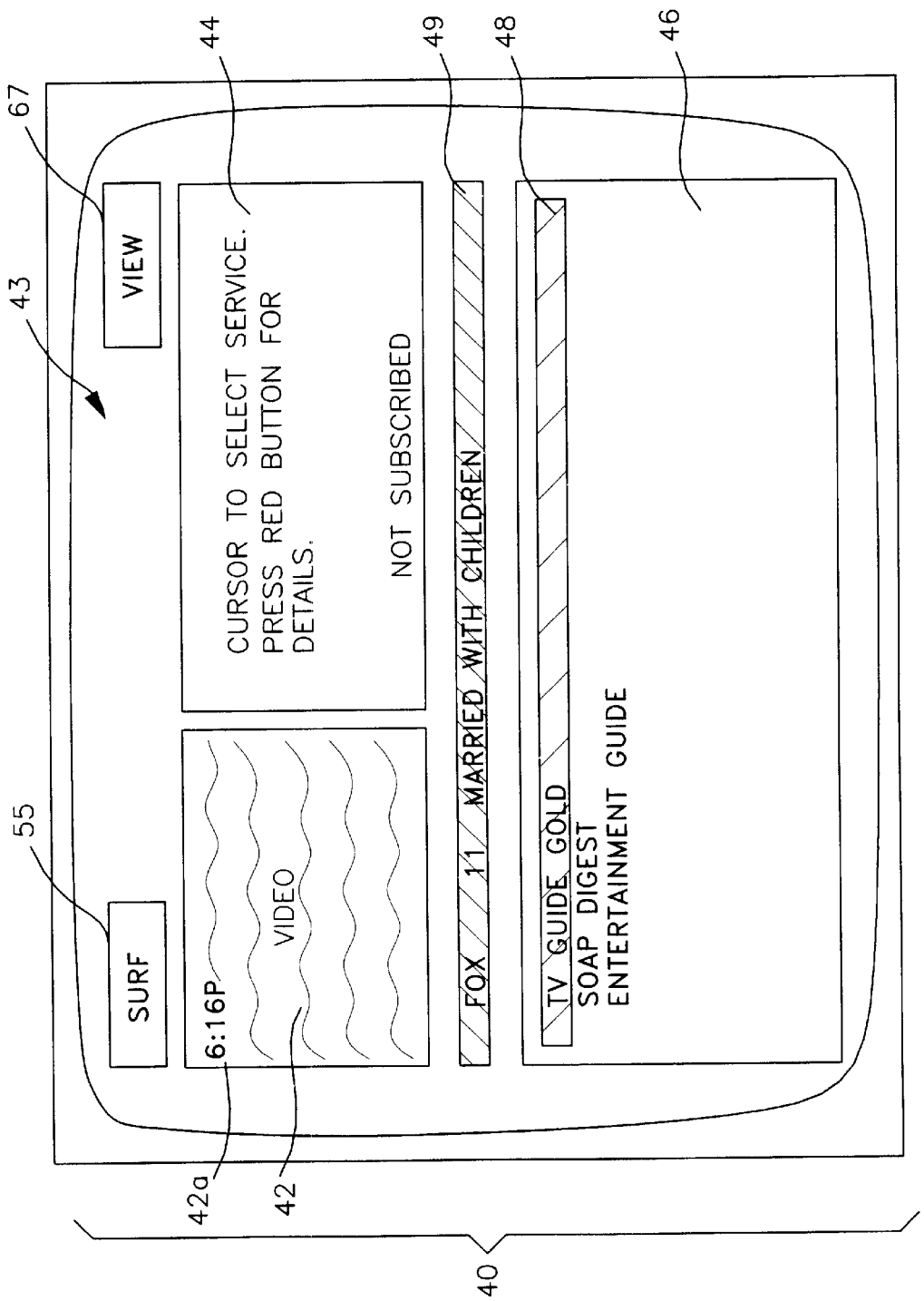
FIG. 12 is a television screen displaying a FEATURE screen formatted in accordance with the embodiment of FIG. 1.

Referring back to FIG. 3, if the viewer selects the green "FEATURE" prompt 45 from the main menu, a subscriber service selection screen will be displayed as shown in FIG. 12. The real time images of the last program highlighted by the cursor 48 from the main menu are displayed in the PIP window 42. A list of services available is displayed in area 46, along with the program listing describing the content of the PIP window 42 in the banner 49. Any of these services can be highlighted by the cursor 48. Instructions for obtaining further information regarding the subscription service highlighted is provided in area 44. In addition, information pertaining to whether the viewer subscribes to the particular service highlighted is also indicated in area 44. The viewer may return to the main menu at any time by selecting the blue "SURF" prompt 55.

Figure 13:
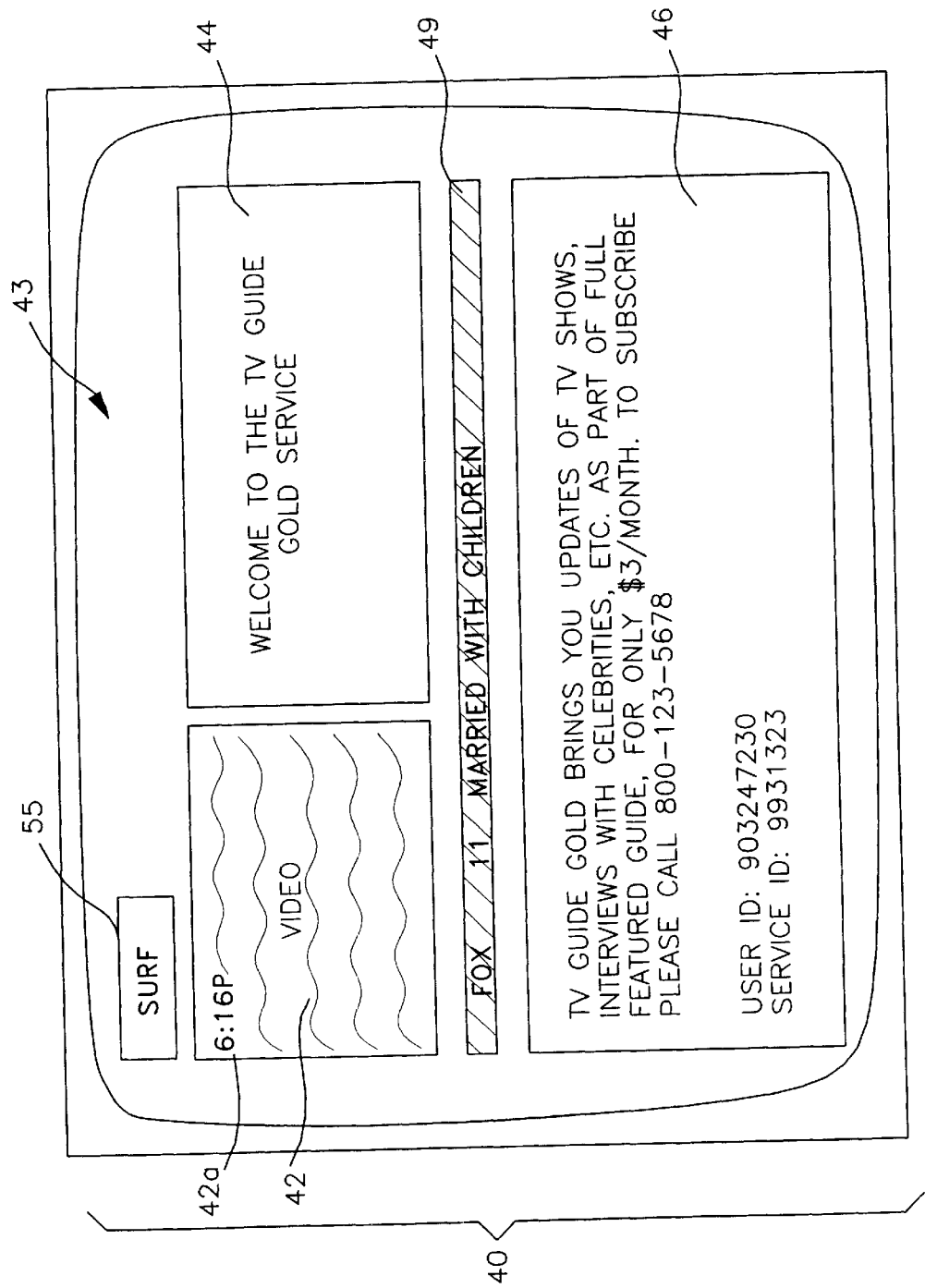
FIG. 13 is a television screen displaying a second level FEATURE screen formatted in accordance with the embodiment of FIG. 1.
Figure 14:
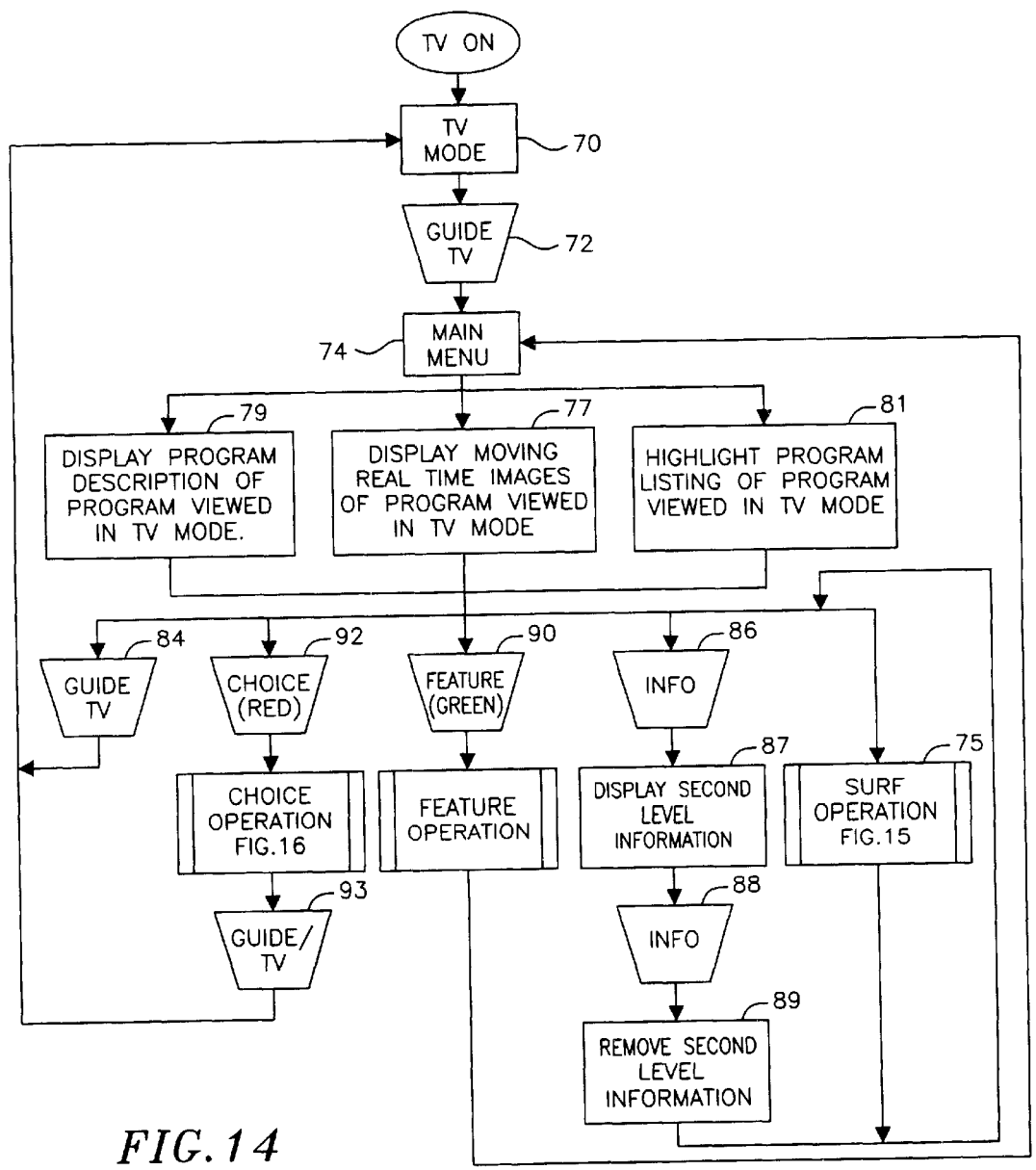
FIG. 14 is a flow diagram showing how the viewer navigates through the main menu in accordance with the embodiment of FIG. 1.

Information pertaining to the subscriber service highlighted by the cursor 48 may be viewed by selecting a red "VIEW" 67 prompt. Once the "VIEW" on-screen option is selected, the microprocessor will scan the tuner in search of the information and couple the information to area 46 of the screen as shown in FIG. 13. The viewer can then subscribe to the servicer by calling the telephone number listed on the screen and entering the user and service ID on the touch pad of a telephone. An example of such an electronic television program guide providing subscriber service options is disclosed in U.S. Patent application Ser. No. 60/024,965, filed Aug. 30, 1996, entitled Subscription Television System and Method, which is expressly incorporated herein by reference as though set forth in full. The moving, real time images of the program being viewed from the subscriber selection screen of FIG. 12 remains in the PIP window 42. The blue SURF prompt 55 takes the viewer back to the main menu.

In a preferred embodiment, the background area 40 of the screen is formatted in the video processor 30. The memory space of video processor 30 corresponding to the area in which the PIP window 42 appears on the screen is left blank; i.e., although overlaid on background area 40, the PIP window 42 does not cover up any of the information of background area 40. As described above, the viewer can move the cursor 48 vertically to highlight the listing of one of the currently playing television programs displayed in area 46 by means of a pair of up/down arrows on the viewer input device. Preferably, to reduce delays in displaying the program schedules, all the program listings for the particular screen format are stored in the video processor 30, even though only a fraction of them are displayed at the same time. When the cursor reaches the top or bottom listing in area 46, the microprocessor 24 recalls further program listings from the video processor 30 for display on the screen.

In all the formats, the moving, real time images of the current television program previously highlighted by the cursor 48 in the main menu or SURF guide remain displayed in the PIP window 42, the program description of the highlighted program is displayed in area 44, program listings of one type or another are displayed in area 46, and one or more prompts are displayed in area 43. The audio portion of the television program displayed in the PIP window 42 is reproduced by the sound system. The PIP display, the sound reproduction, and the program description in area 44 enable the viewer to assess better whether or not to watch the highlighted program. Preferably, two levels of detail are available for the program description. Normally, the first level detail of the program description is displayed in area 44 as described above. When more detail is desired, the viewer operates the viewer input device 28 to display a second level of detail of the program description. There are two options for the display of the second level detail. As one option, the second level detail can replace the first level detail in area 44. This has the advantage that the program listings can continue to be seen by the viewer while more detail about the program description is displayed. As the other option, the second level detail can replace the program listings in area 46. This has the advantage that more space is available to display the second level of detail than the first level.

The screen formats and the links between the individual guides are designed with two objectives in mind—first, to provide uninterrupted viewing of a television program and second, never to leave the electronic guide while navigating through it, until the viewer returns to the TV mode. As described below, the guides are linked to each other for the most part in a one way hierarchy that is accessed by the on-screen prompts which are color coded to the buttons on the viewer input device and simplify the navigation through the electronic guides. At each level of the hierarchy, with a few exceptions, the viewer has the choice of returning to the SURF guide screen, or moving down to a guide at a lower level in the hierarchy. Generally, once at the lowest level, the only choice is to return to the SURF guide screen.

The hierarchy of the electronic program guide is best understood with reference to FIGS. 14 to 19. Turning to FIG.

14, the viewer enters the electronic program guide from the TV MODE 70 by selecting the GUIDE/TV 72 button on the viewer input device. As a result, the MAIN MENU 74 is displayed on the screen. This is the starting point for entry into each of the other guides.

The MAIN MENU 74 displays program listings of television programs being broadcast at the current time. The moving, real time images of the current television program previously viewed in the TV mode are displayed in the PIP window 77, a brief program description of that program is displayed 79, and a program listing of currently broadcast television programs is presented to the screen with the listing of the program viewed in the PIP window highlighted 81. The MAIN MENU is formatted to allow the user to perform a SURF 75 operation directly from this screen. Referring to FIG. 13 for the details of the SURF operation, the viewer moves the cursor vertically 76 to highlight the program listings 78 and the tuner is set to the channel for the program listing highlighted 80. The moving, real time images of the program listing highlighted are coupled through the tuner to the PIP window 82 and a brief description of the highlighted program is displayed 84.

Returning to FIG. 12, the viewer may return to the full screen TV MODE 70 from the MAIN MENU 74 by selecting the GUIDE/TV 84 button on the viewer input device. The INFO 86 button on the viewer input device is used to display second level detail of the program information highlighted 87. The second level detail is removed from the screen 89 by pressing the INFO 88 button a second time.

From the MAIN MENU 74, the FEATURE 90 on-screen option or the CHOICE 92 on-screen option may be selected. The FEATURE option is designed to allow the viewer to return directly to the main menu from the FEATURE screen. Conversely, once the CHOICE operation is commenced, the main menu cannot be accessed without first returning to the TV mode 70 by selecting the GUIDE/TV 93 button on the viewer input device.

Figure 16:
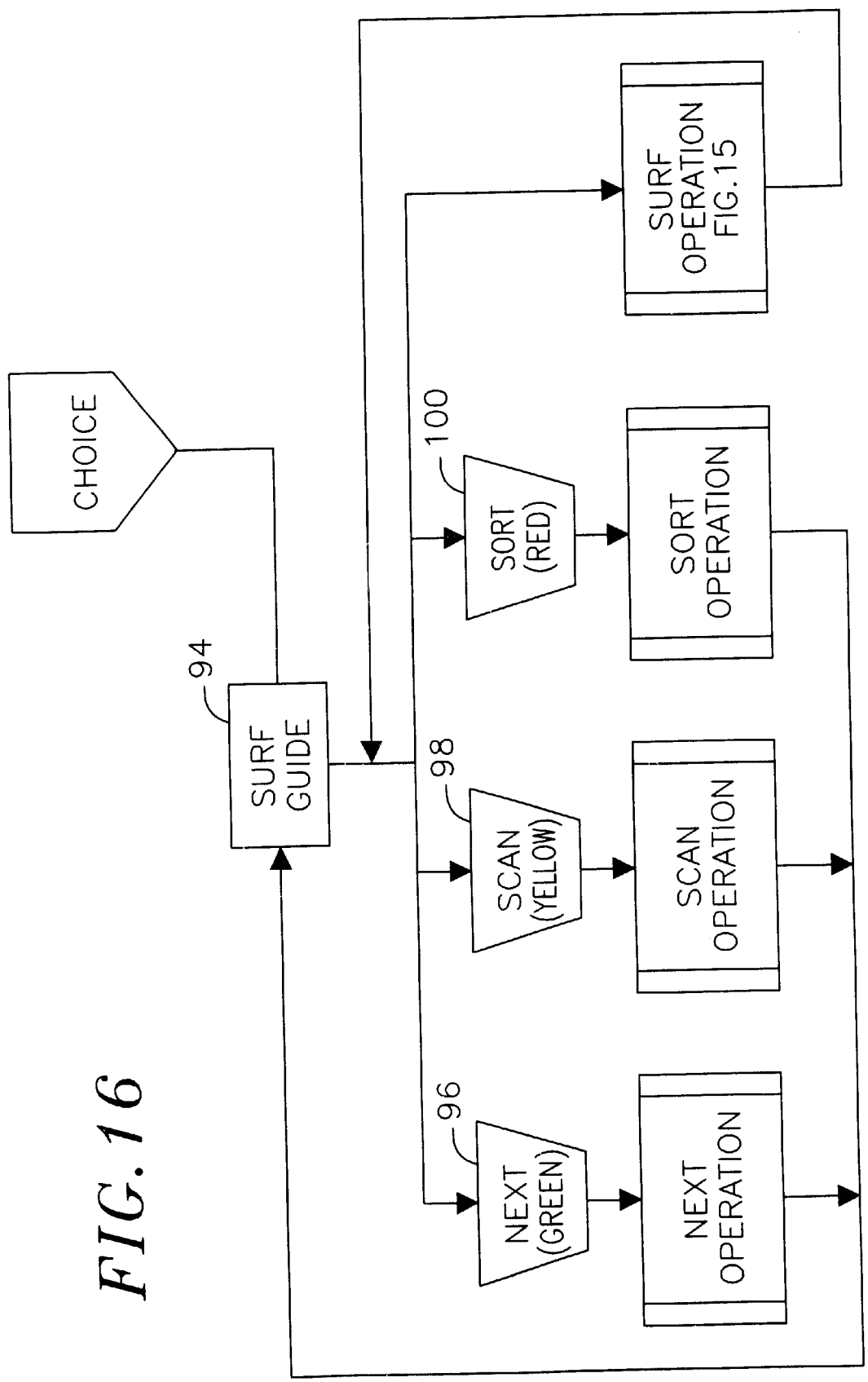
FIG. 16 is a flow diagram showing how the viewer navigates through the SURF guide in accordance with the embodiment of FIG. 1.

Turning to FIG. 16, a flow diagram for the CHOICE operation is shown. Once the CHOICE on-screen option is selected by the viewer, a SURF guide 94 is pulled up on the screen. From this guide, the viewer can "surf" through the currently broadcast programs as described above for FIG. 13. In addition, the viewer may access addition program guides from the SURF guide 94 screen. By selecting the on-screen options presented in color prompts with the matching color buttons on the viewer input device, the viewer may select the NEXT guide 96 screen, the SCAN guide 98 screen, or the SORT guide 100 screen. From each of these electronic program guides, the viewer has the choice of returning to the SURF guide 94 screen.

Figure 17:
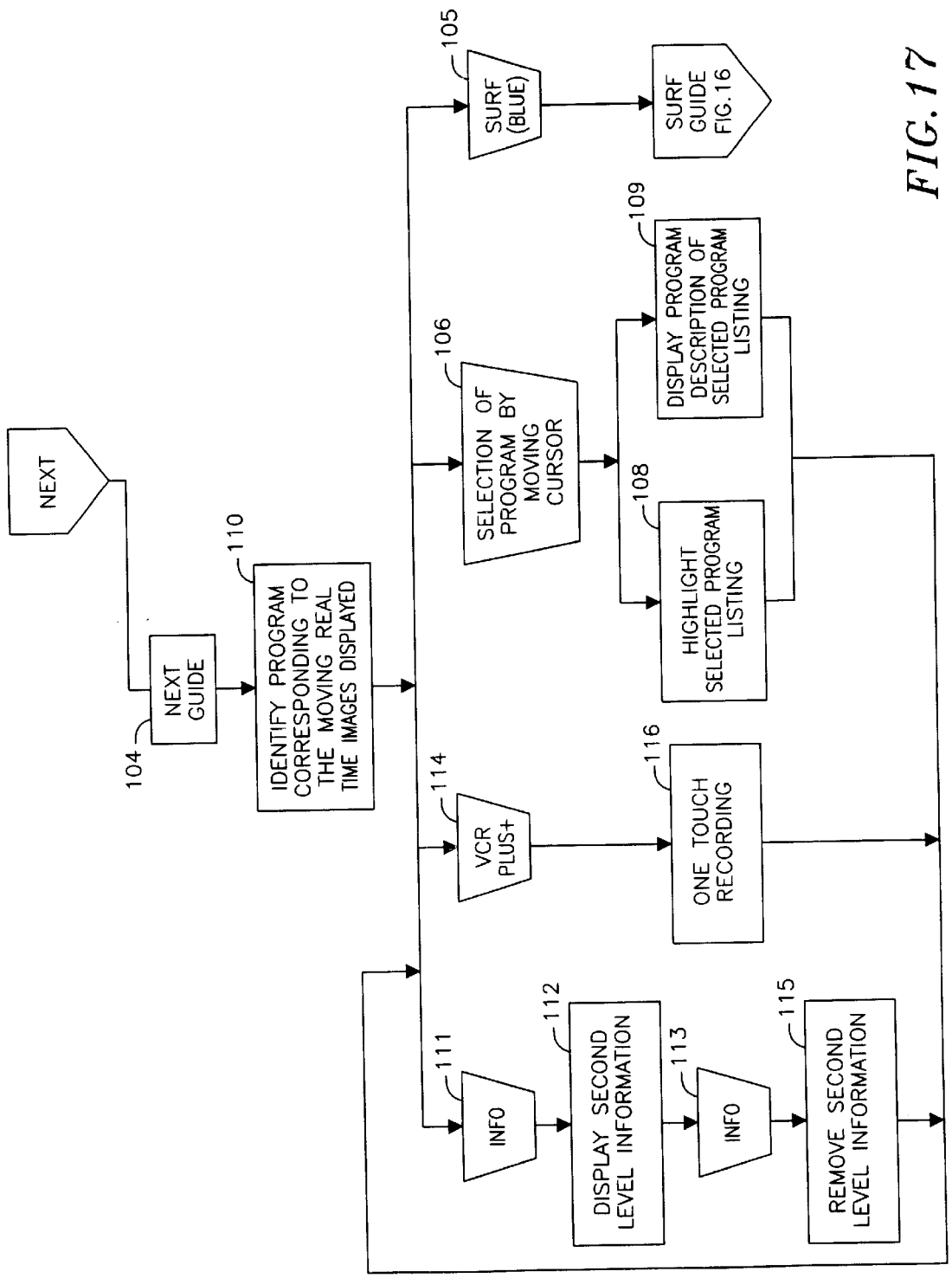
FIG. 17 is a flow diagram showing how the viewer navigates through the NEXT guide in accordance with the embodiment of FIG. 1.

The operation of the NEXT guide is best illustrated with reference to FIG. 17. The NEXT guide 104 screen lists all the programs for the channel selected from the SURF guide from the currently broadcast program into the future for a specified time period. From the NEXT guide screen, the viewer may return to the SURF guide screen at any time by selecting the blue SURF 105 prompt.

The viewer maneuvers through the NEXT guide screen 104 by moving the cursor vertically 106 to highlight the current of future program listings on the designated channel 108. A brief description of the highlighted program is displayed on the screen 109. The tuner remains set to the designated channel so that the moving real time images of the television program previously viewed in the SURF guide screen remains in the PIP window for uninterrupted viewing and the program listing for that program is identified on the screen 110.

The NEXT guide screen provides secondary level detail of the highlighted program 112 similar to that of the SURF guide screen. The INFO 111 button on the viewer input device is selected to obtain the secondary level detail. The second level detail is removed 115 by selecting the INFO 113 button a second time.

The NEXT guide screen also operates in conjunction with a video-cassette recorder (VCR) to provide one touch recording 116 capability of a television program. The viewer may initiate recording by highlighting the desired program to be recorded and selecting the VCR Plus+ 114 button on the viewer input device. The program to be recorded is stored in the microprocessor and is preferably available for review and modification.

Figure 18:
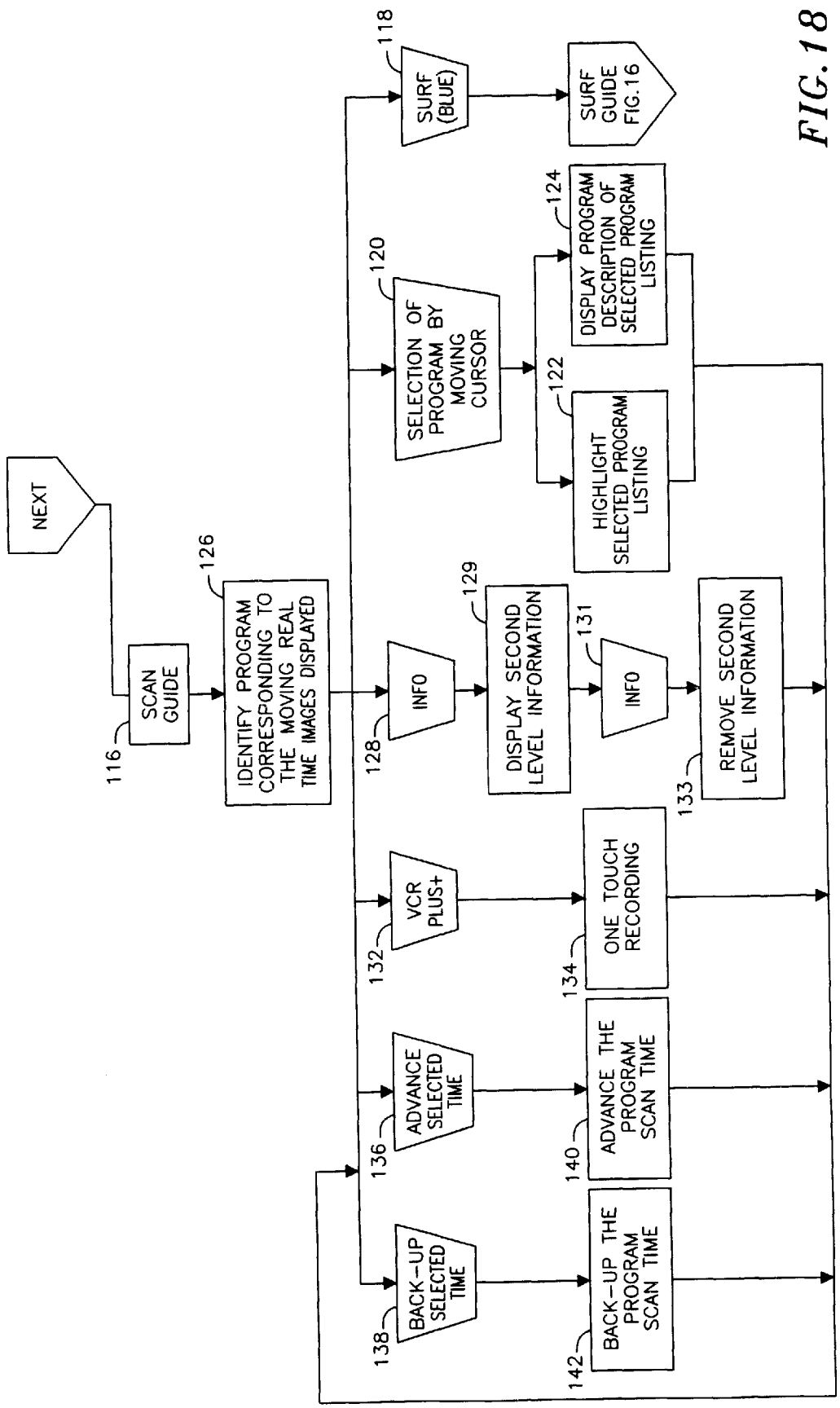
FIG. 18 is a flow diagram showing how the viewer navigates through the SCAN guide in accordance with the embodiment of FIG. 1.
Figure 19:
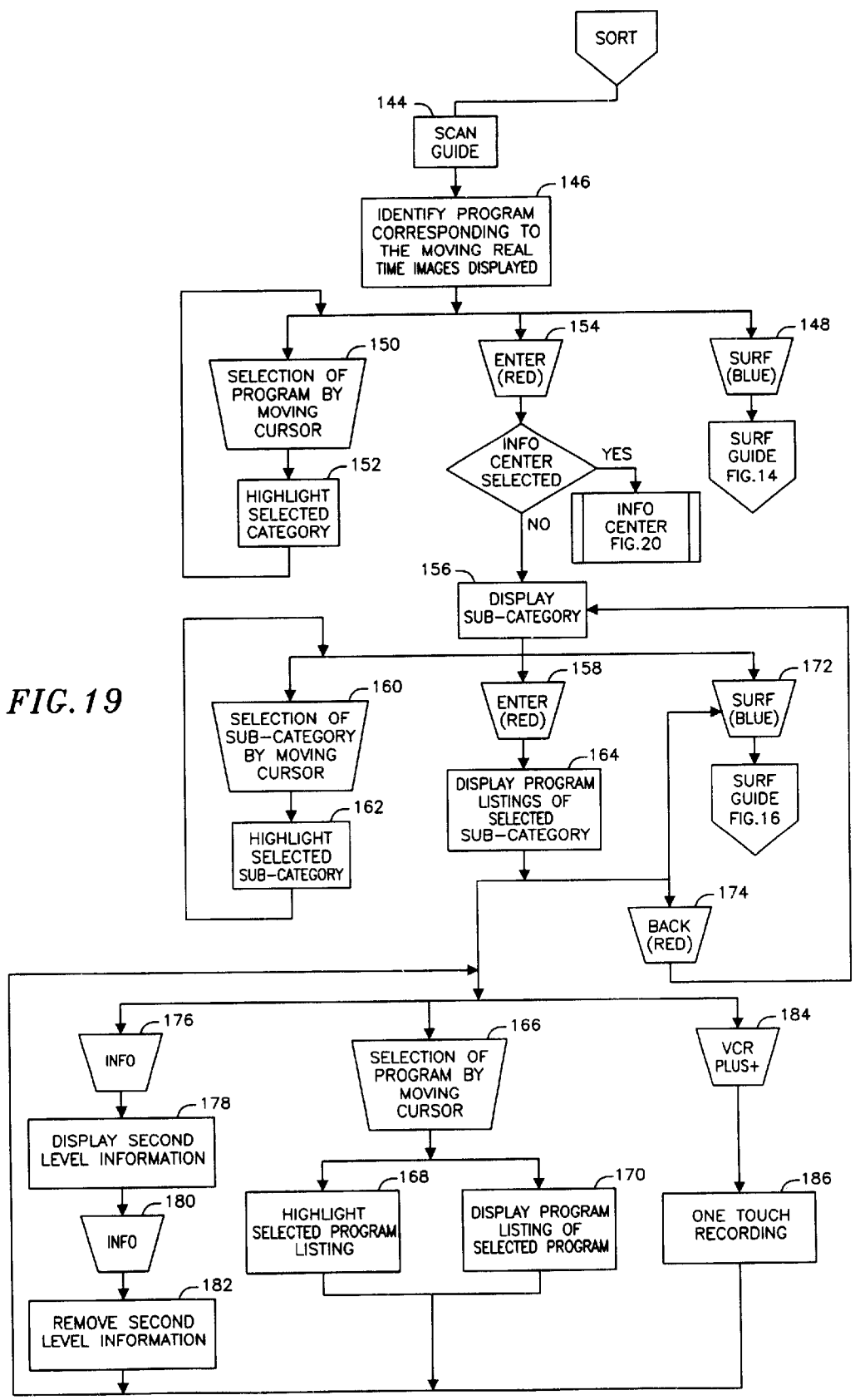
FIG. 19 is a flow diagram showing how the viewer navigates through the SORT guide in accordance with the embodiment of FIG. 1.
Figure 20:
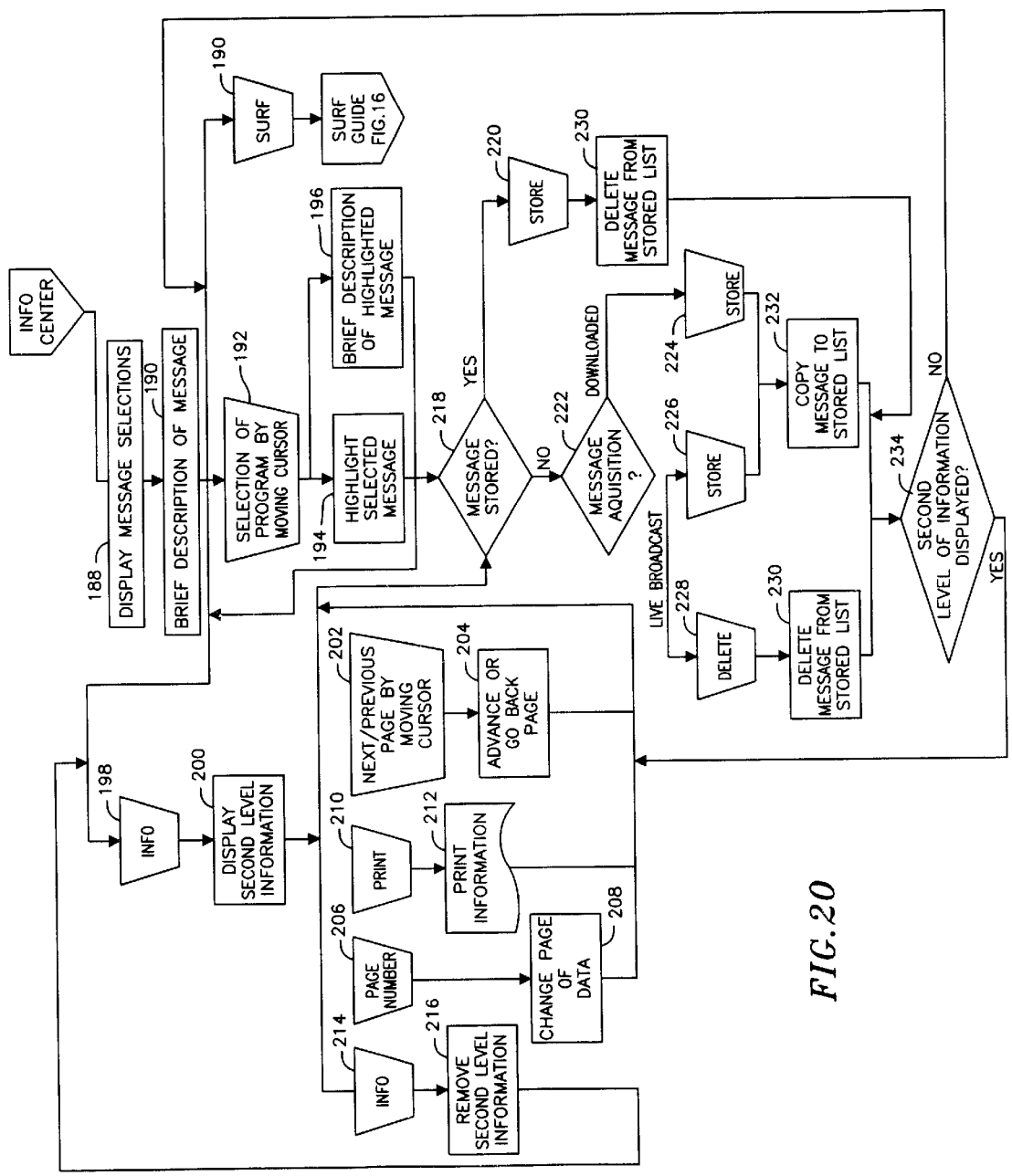
FIG. 20 is a flow diagram showing how the viewer navigates through the INFO CENTER screen in accordance with the embodiment of FIG. 1.

The operation of the SCAN guide is best illustrated with reference to FIG. 18. The SCAN guide 116 screen displays the television programs for each channel at selected times. From the SCAN guide 116 screen, the viewer may return to the SURF guide at any time by selecting the blue SURF 118 prompt.

Initially, when the viewer enters the SCAN guide, the selected time defaults to the immediate past half-hour. By way of example, if the viewer selects the SCAN guide screen at 2:15 p.m., the selected time will default to 2:00 p.m. and the program listings on each channel airing at 2:00 p.m. will be displayed on the screen. The viewer moves the cursor vertically 120 to highlight selected program listings on different channels 122. A brief description of the highlighted program is displayed on the screen 124. The tuner remains set to the last channel selected from the SURF guide so that the moving, real time images of the television program viewed from the SURF guide screen remains in the PIP window for uninterrupted viewing and the program listing for that program is identified on the screen 126.

The SCAN guide screen provides secondary level detail of the highlighted program 122 exactly as the SURF and NEXT guides do. The INFO 128 button on the viewer input device is selected to access secondary level detail 129. The secondary level detail is removed 133 from the screen by selecting the INFO 131 button a second time.

The SCAN guide screen also operates in conjunction with a video-cassette recorder (VCR) to provide one touch recording 132 capability of a television program. The viewer may initiate recording by highlighting the program and selecting the VCR Plus+ 134 button on the viewer input device. The program to be recorded is stored in the microprocessor and is preferably available for review and modification.

Program scanning may be performed in one-half hour increments. A red on-screen prompt for advancing the scan time 136 by a one-half hour and a green on-screen prompt for backing up the scan time 138 by one-half hour are provided as on-screen options. The current scan time is displayed between the red and green prompts. Each time the viewer selects the red prompt, the guide scan time advances one-half hour so the programs broadcast one-half hour later are displayed. As a result, the scan time displayed on the screen increases by one-half hour as does the red and green prompts 140. By way of example, if the scan time displayed is currently 4:00 PM, then the green prompt will indicate 3:30 PM and the red prompt will indicate 4:30 PM. In the event the viewer selects the red prompt thereby advancing the scanning time by one-half hour, the scan time displayed will be 4:30 PM and the green and red prompts will be 4:00 PM and 5:00 PM, respectively.

Conversely, the scan time may be backed up one-half hour by selecting the green prompt so that the programs broadcast one-half hour earlier are displayed. As a result, the displayed time decreases by one-half hour as does the times displayed in the red and green prompts 142.

The red prompt 136, for advancing the scan time, is only present if the current scan time is not the latest possible scan time. Similarly, the green prompt 138, for backing up the scan time, is only present if the current scan time is not the earliest possible scan time. Thus, when the SCAN guide 116 screen is initially entered from the SURF guide, the scan time defaults to the immediate past half hour time slot from the current time. This is the earliest time available for scanning, and therefore, the green prompt 138 for backing up the scan time is not presented to the screen. Referring to the previous example where the viewer enters the SCAN guide 116 screen from the SURF guide at 2:15 P.M., a scan time of 2:00p is displayed on the screen accompanied by a red on-screen prompt 136 displaying 2:30 P.M. There is no green prompt presented to the screen because the scan time cannot be backed up prior to 2:00 P.M. If the viewer advances the scan time to 2:30 P.M. by selecting the red on-screen prompt 136, a green prompt 138 will appear on the screen displaying a time of 2:00P.

Figure 15:
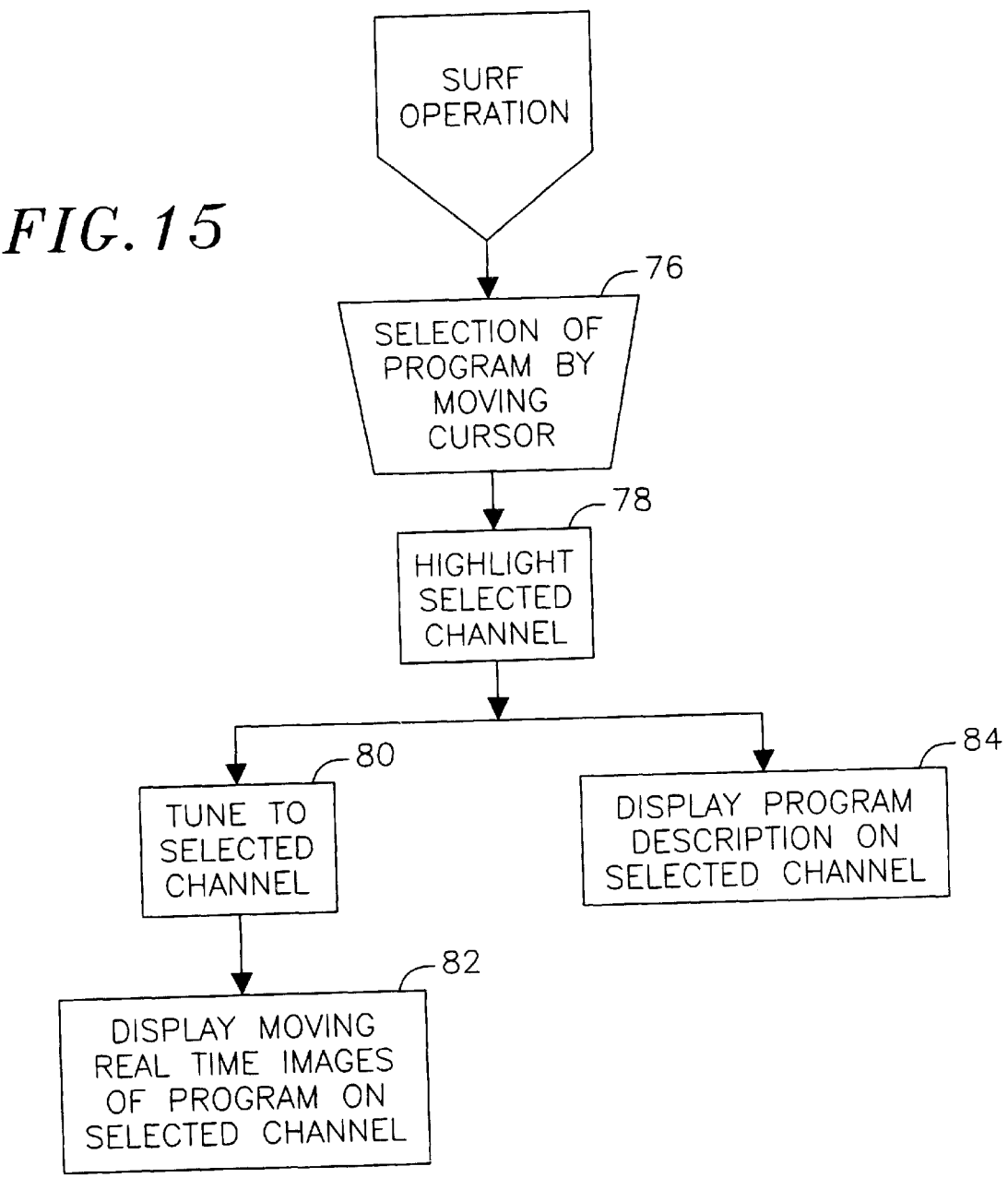
FIG. 15 is a flow diagram showing how the viewer navigates through the SURF feature in accordance with the embodiment of FIG. 1.

The operation of the SORT guide is best illustrated with reference to FIG. 15. The SORT guide screen 144 displays the television programs for each channel by category or sub-category. The tuner remains tuned to the channel previously selected in the SURF guide while navigating through the SORT guide so that the viewer can continue watching a television program in the PIP window without interruption. The program listing for the television program broadcast in the PIP window remains displayed on the screen 146. From the SORT guide screen, the viewer may return to the SURF guide screen by selecting the blue SURF 148 prompt.

The initial SORT guide screen comprises a list of categories. i.e., movies, sports, variety, etc. Alternatively, in a preferred embodiment, an information database may be accessed from this guide through an Information Center ("INFO CENTER") selection discussed in greater detail below. The viewer may select any category on the list, including the INFO CENTER, by moving the cursor vertically 150 to highlight the desired category 152 and selecting the red ENTER prompt on the screen 154. Assuming that the viewer does not select the INFO CENTER, once the desired category is selected, sub-categories of the selected category may be viewed on the screen 156 by selecting the red ENTER prompt 158 again. The viewer may select any sub-category on the list by moving the cursor vertically 160 to highlight the desired sub-category 162 and then selecting the red ENTER prompt 158. By way of example, if the viewer selects the red ENTER prompt while the cursor is positioned on the MOVIE category, a listing of sub-categories such as ACTION, COMEDY, HORROR, WESTERN, etc. will be displayed on the screen. The viewer may then highlight the desired sub-category with the cursor and select the red ENTER prompt to retrieve a list of movies in the selected sub-category. The viewer can scan the list by moving the cursor vertically 160 to highlight selected movies 168. A program description of the highlighted movie will be displayed on the screen 170. From the program listings for any sub-category screen, the viewer has the option of returning to the SURF guide screen by selecting the blue SURF prompt 172 or back to the sub-category screen by selecting the red BACK prompt 174.

The SORT guide screen also provides secondary level detail of the highlighted program by depressing the INFO 176 button on the viewer input device. The second level detail is displayed in the program listing area, or alternatively, over the entire screen 178. The second level detail is removed from the screen 182 by selecting the INFO 172 button a second time.

The VCR may also be programmed to record a selected program from the SORT guide. One touch recording capability is provided by selecting the VCR Plus+ button on the viewer input device. This will cause the information pertaining to the highlighted program to be stored in the microprocessor for controlling the tuner and the VCR when the selected program is broadcast 186.

In the event the viewer selects the INFO CENTER, a selection of informational topics or messages are displayed in a vertical column format on the screen 188. The cursor is defaulted to the informational topic at the top of the column and a brief description of the topic is displayed 190. The viewer may exit the INFO CENTER and return to the SURF guide by selecting the blue SURF prompt 190.

The viewer may select any informational topic by moving the cursor vertically 192 to highlight the desired topic 194. A brief description of the highlighted topic is presented to the screen 196. If the viewer desires to view the entire message, the INFO button on the viewer input device is selected 198 and the entire message is presented to the display 200. If the message has multiple pages, the viewer can page up or down 204 using the cursor control buttons on the viewer input device 202. If the text is organized in indexed pages, the viewer may access any page directly 208 by entering the page number on the numerical buttons on the viewer input device 206. Preferably, a hard copy of the message may be printed 212 using any conventional printer connected by an input/output port by selecting the red PRINT prompt 210 on the screen.

The entire contents of the message may be stored in or deleted from either of the two INFO CENTER screens. In a preferred embodiment, only the on-screen yellow DELETE prompt 220 is presented to the screen when the message is already stored in memory 218. Alternatively, only the on-screen green STORE prompt 224 is presented to the display when the message is not stored in memory 218 and the source of the message is a preloaded database 222. Both the yellow DELETE prompt 228 and the green STORE prompt 226 are presented to the display when the message is not stored in memory 218 and the message is telecast in a live broadcast 222. The viewer may delete the message from memory 230 by selecting the DELETE prompt and may copy the message to memory 232 by selecting the STORE prompt.

The viewer cannot access the SURF guide screen from the second level information screen 234 of the INFO CENTER. Rather, the viewer must reselect the INFO button 214 on the viewer input device. As a result, the informational topics reappear on the screen and the viewer may now exit the INFO CENTER by selecting the on-screen SURF prompt 55.

Figure 21:
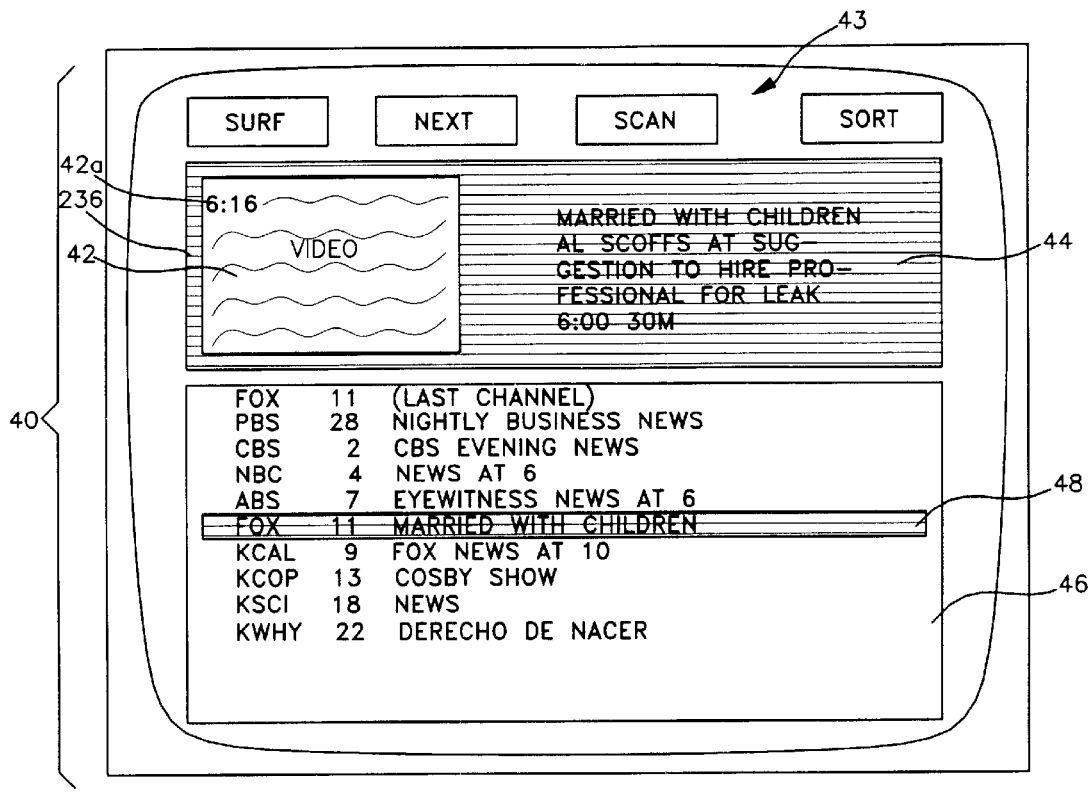
FIG. 21 is a television screen displaying a SURF guide formatted to designate by color coding the title of the program in the PIP window and the title of the program in the program description area in accordance with the embodiment of FIG. 1.
Figure 22:
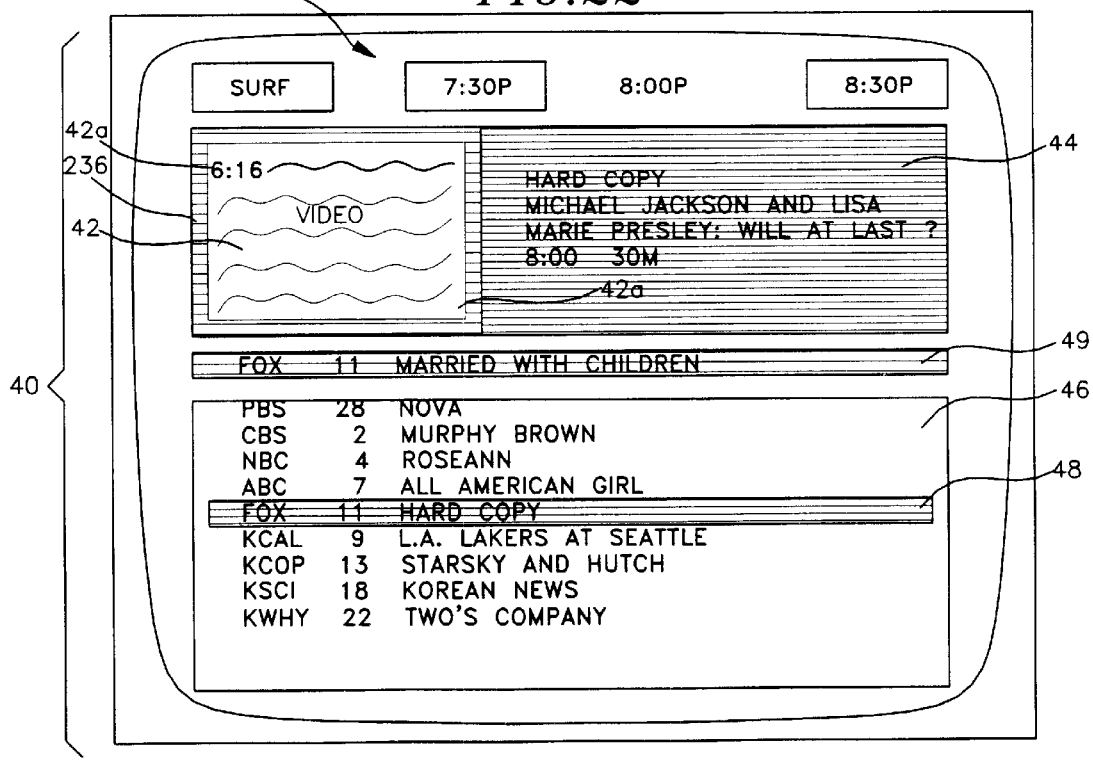
FIG. 22 is a television screen displaying a SCAN guide formatted to designate by color coding the title of the program in the PIP window and the title of the program in the program description area in accordance with the embodiment of FIG. 1.

A feature of the invention that facilitates viewer orientation in the electronic guide is to color code the PIP window 42 and the program description area 44 consistently with the titles of the programs to which the information in these areas relate. Specifically, as illustrated in FIG. 21, in the SURF guide (FIG. 4) PIP window 42 has a border 236 that is the same color, e.g., dark blue, as the background of area 44 and the cursor 48, which forms a color bar. Further, as illustrated in FIG. 22, in the SCAN guide (FIG. 6), as well as the NEXT guide (FIG. 5) and the SORT guide (FIG. 7), where the description in area 44 relates to a different program than that displayed in the PIP window 42, the background of area 44 is a different color or shade than the border 236. The latter guides all have a cursor (color bar) 48 that identifies the title of the program described in area 44. For example, the background of area 44 and cursor 48 are light blue to signal to the viewer that the title highlighted by cursor 48 identifies the program described in area 44, while the border 236 and the banner 49 remain dark blue to signal that the title in the banner 49 identifies the program in the PIP window 42.

Figure 23:
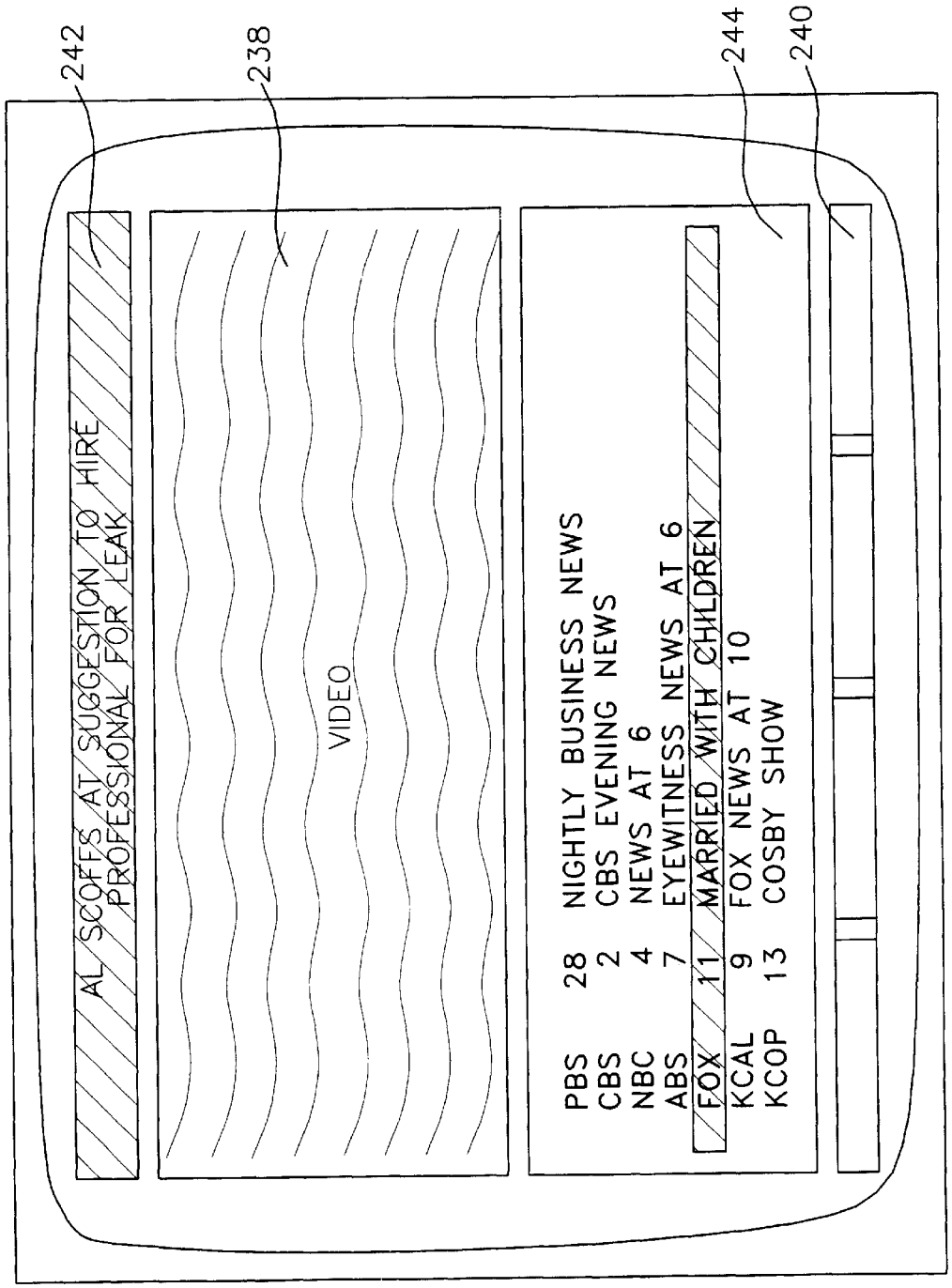
FIG. 23 is a screen formatted to display a real time television program with an electronic television program guide with a television receiver that does not have a PIP chip.

If the television receiver does not have a PIP chip, the described screen formats can be simulated by rearranging the prompts and the guide and program description information and overlaying such information over the real time moving images of the current television program. In contrast to the PIP format, this results in loss of part of the picture of the television program. But, the remainder of the picture, which is the center part of the image, together with the sound portion thereof generally convenes most of the essential information of the television program. In FIG. 23, such a simulation has a truncated real time picture area 238, instead of the PIP window 42, a message prompting area 240, instead of area 43, a program description area 242, instead of area 44, and an electronic program guide area 244, instead of area 46. Area 242 is located across the full width at the top of the screen area and preferably does not include the program title. The prompt area is at the bottom of the screen area and is otherwise like the PIP screen format described above. The guide area 244 is between areas 238 and 240 and preferably has several fewer lines of program listings than the PIP screen format. The size of the picture in area 238 is the same as the picture when the electronic guide is not operating, but the top and bottom parts of the picture are cut off by areas 240, 242, and 244. To implement this embodiment of the invention, the following modifications in the television receiver of FIG. 1 are required. The microprocessor 24 is configured to format the screen as shown in FIG. 23, leaving blank area 238, and the PIP chip 19 is replaced by a video mixer.

In an alternative embodiment, the SURF, NEXT and SCAN guides can be combined into one screen in a time-channel grid format. In the time-channel grid format, the microprocessor 24 also controls the cursor 48 responsive to the cursor key of the viewer input device 28, which in this embodiment includes a horizontal cursor control, such as a pair of right/left arrows. As described above, the television program information for the highlighted program listing is retrieved by the microprocessor 24 from program schedule memory 22 and the corresponding program description is displayed on the screen. The current television program broadcast on the channel last selected in the SURF guide is presented to the PIP window.

Figure 24:
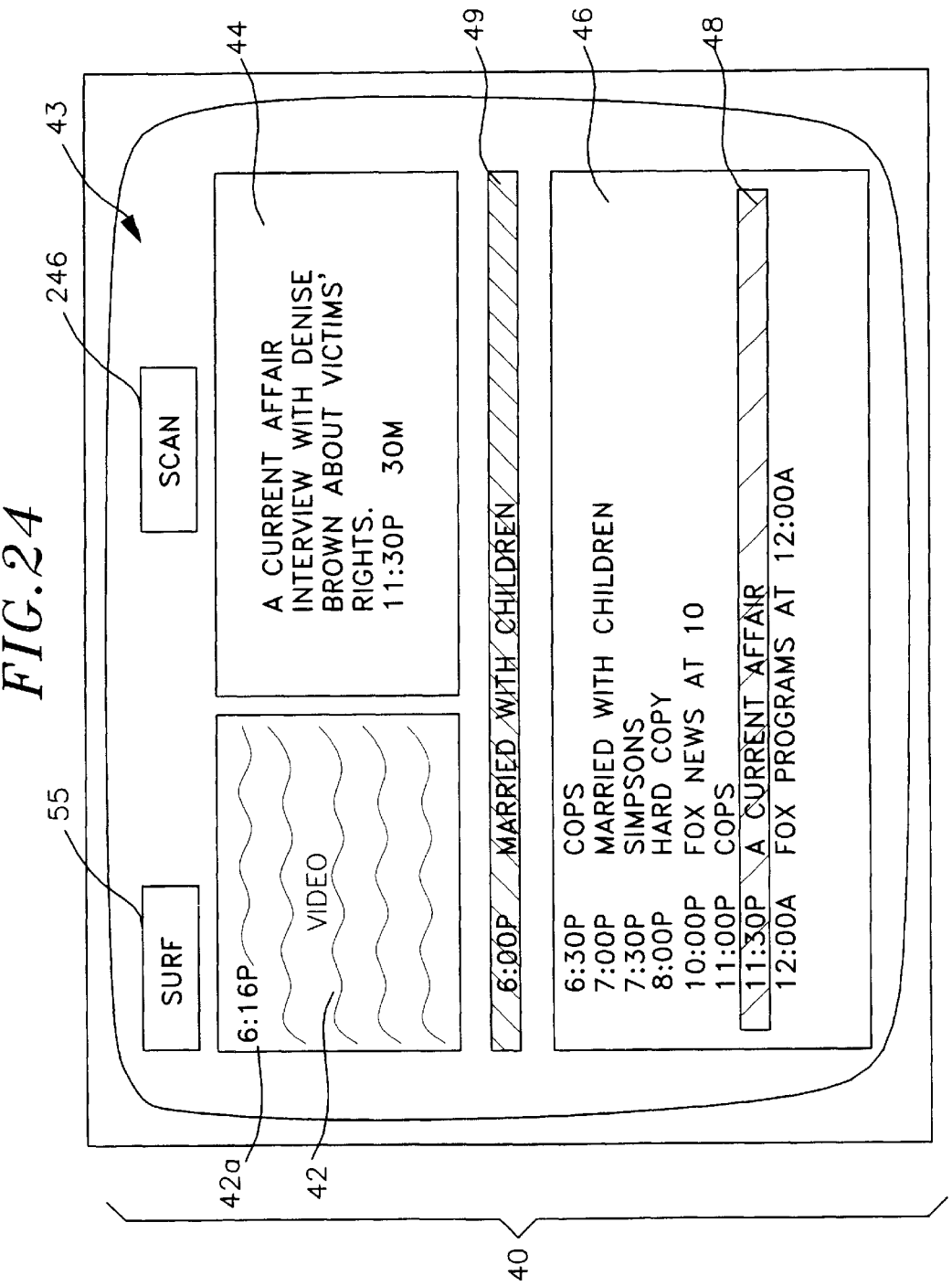
FIG. 24 is a television screen displaying a NEXT guide with direct SCAN guide access capability formatted in accordance with the embodiment of FIG. 1.
Figure 25:
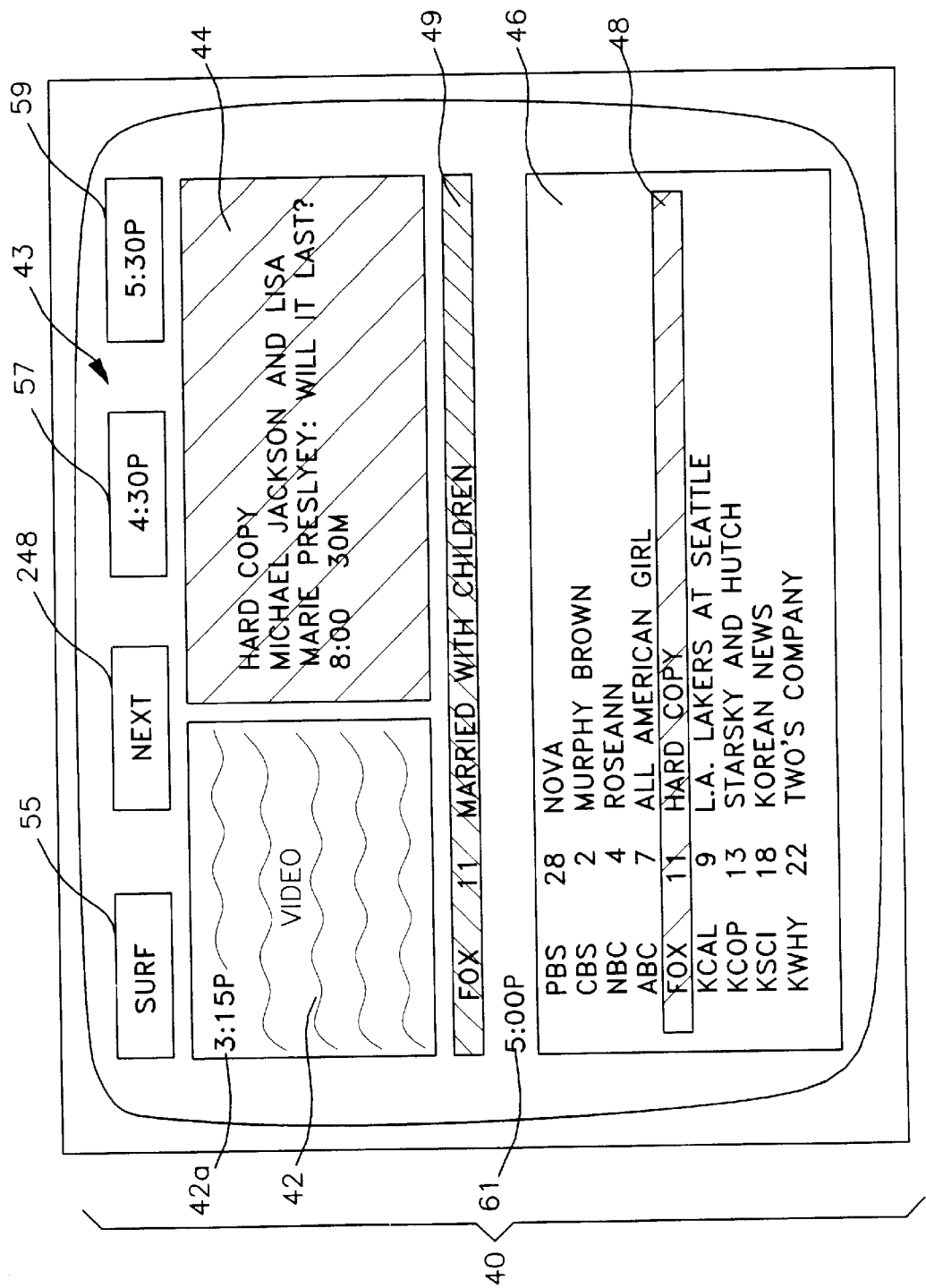
FIG. 25 is a television screen displaying a SCAN guide with direct NEXT guide access capability formatted in accordance with the embodiment of FIG. 1.

The two dimensional time/channel grid format guide, can be implemented in another embodiment of the present invention using multiple guide screens. The two dimensions can be isolated by including a SCAN on-screen option 246 in the NEXT guide, and a NEXT on-screen option 248 in the SCAN guide, respectively, as shown in FIGS. 24 and 25.

Figure 26:
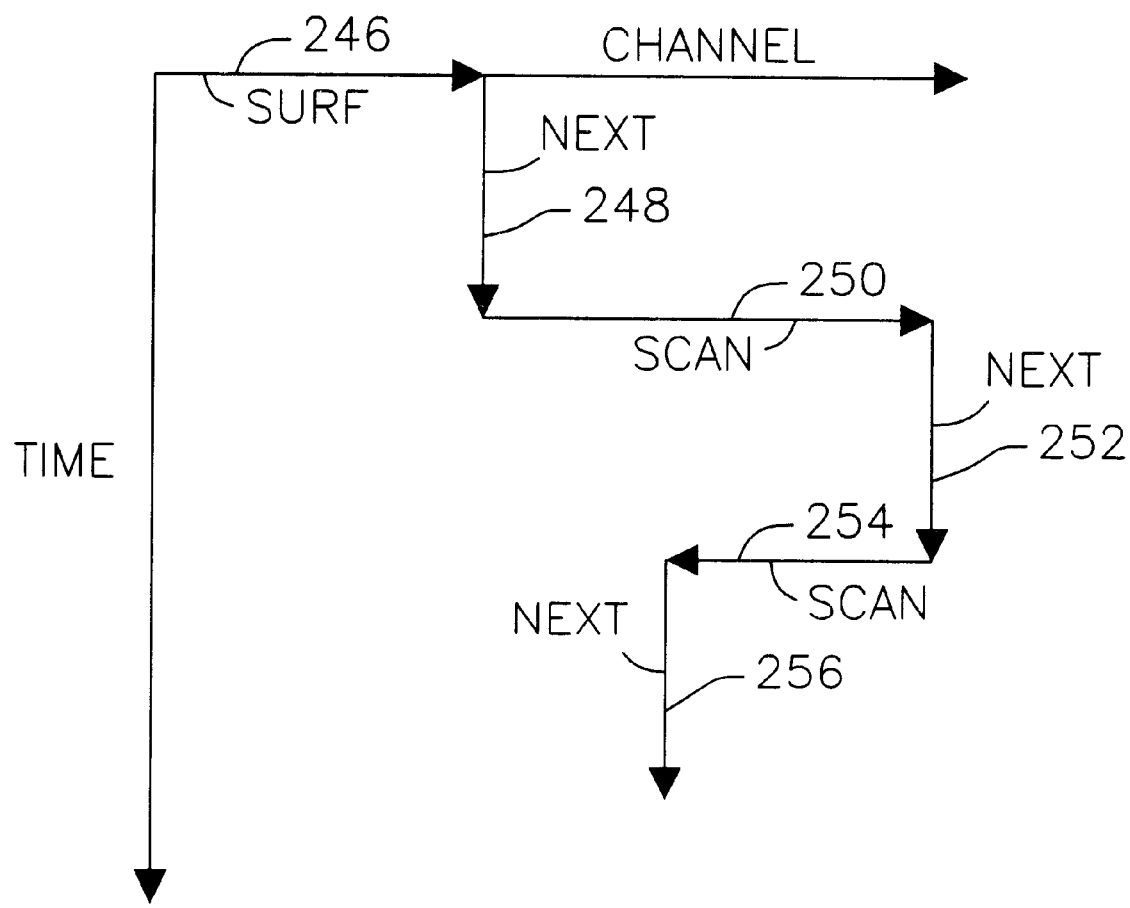
FIG. 26 is a graph illustrating an alternative way for the viewer to navigate through the television program guide using the screen formats of FIGS. 24 and 25 in accordance with the embodiment of FIG. 1.

The method of navigation through these electronic guides is best understood with reference to FIG. 26. The abscissa represents time and the ordinate represents channel. As represented by a line 246, starting in the SURF guide, the viewer moves the cursor from channel to channel and current programs are displayed in the PIP window. As represented by a line 248, the viewer selects the NEXT guide (see FIG. 24) and moves the cursor from time slot to time slot. The program on the channel to which the tuner was last set in the SURF guide remains displayed in the PIP window and the description of the program on said channel at the time slot highlighted by the cursor is displayed. As represented by a line 250, the viewer selects the SCAN guide, (see FIG. 25), directly from the NEXT guide and moves the cursor from channel to channel. The initial time of the programs being scanned is the last time slot selected in the NEXT guide. The program on the channel to which the tuner was last set in the SURF guide remains displayed in the PIP window and the description of the program on the channel highlighted by the cursor at the time slot last highlighted in the SCAN guide is displayed. As represented by a line 252, the viewer again selects the NEXT guide, (see FIG. 24), and moves the cursor from time slot to time slot on the channel last selected from the SCAN guide. The program on the channel to which the tuner was last set in the SURF guide remains displayed in PIP window and the description of the program highlighted by the cursor is displayed. As represented by a line 254, the viewer selects again the SCAN guide, (see FIG. 25), directly from the NEXT guide and moves the cursor from channel to channel for the time slot last selected from the NEXT guide. The program on the channel to which the tuner was last set in the SURF guide remains displayed in the PIP window and the description of the program highlighted is displayed. As represented by a line 256, the viewer again selects the NEXT guide, (see FIG. 24), directly from the SCAN guide and moves the cursor from time slot to time slot on the channel last selected from the SCAN guide. The program on the channel to which the tuner was last set in the SURF guide remains displayed in the PIP window and the description of the program highlighted by the cursor is displayed. In this manner the viewer can navigate either into the future or toward the current time and across channels to determine the television program schedule.

It is apparent from the foregoing that the present invention satisfies an immediate need for a electronic program guide which facilitates the selection of the television programs to be watched by a viewer. The features of this electronic program guide may be embodied in other specific forms and used with a wide variety of telecommunication services, without departing from the spirit or essential attributes of the present invention. It is, therefore, desired that the present embodiment be considered in all respects as illustrative and not restrictive, reference being made to the appended claims rather than the foregoing description to indicate the scope of the invention.

What is claimed is:

1. An electronic program guide, comprising:

a display;

a memory for storing television program schedule information comprising a plurality of titles of currently broadcast television programs;

means for coupling a television program guide comprising at least a portion of the titles from said memory to said display;

means for selecting one of the displayed titles from the television program guide; and a tuner having an input for receiving a television transmission comprising a plurality of television programs, and an output for passing the television program corresponding to the selected title from the television program guide, said tuner output being coupled to said display for displaying the television program concurrently with the television program guide.

2. The electronic program guide of claim 1 wherein said television program schedule information further comprises a description for each of the titles, and said coupling means further comprises means for presenting the description corresponding to the selected title to said display for displaying the description concurrently with the television program and the television program guide.

3. The electronic program guide of claim 2 wherein said display comprises a cursor to indicate the selected title.

4. The electronic program guide of claim 3 wherein the displayed description includes a background having a first color, and said cursor comprises a second color, said first color being substantially the same as the second color.

5. The electronic program guide of claim 1 wherein said television program schedule information further comprises a plurality of titles of television programs for future broadcast, and said coupling means further comprises means for selectively presenting to said display one of said television program guide and a second television program guide comprising the titles of the future television programs and the current broadcast television program for one channel of the television transmission.

6. The electronic program guide of claim 5 wherein said display comprises a prompt for the second television program guide when the television program guide is selectively coupled to said display, said prompt having a color, and said coupling means comprising a user input device having a button for selecting the second television program guide, said button having a color substantially the same as the color of the prompt.

7. The electronic program guide of claim 5 wherein said display comprises a prompt for the television program guide when the second television program guide is selectively coupled to said display, said prompt having a color, and said coupling means comprising a user input device having a button for selecting the television program guide, said button having a color substantially the same as the color of the prompt.

8. The electronic program guide of claim 5 wherein said one channel is the channel of the television program passed by said tuner.

9. The electronic program guide of claim 5 wherein said coupling means further comprises means for presenting the title of the television program tuned by said tuner to said display when the second television program guide is selectively coupled to said display.

10. The electronic program guide of claim 9 wherein said display comprises a banner for indicating the title of the television program passed by said tuner when the second television program guide is selectively coupled to said display.

11. The electronic program guide of claim 5 wherein said television program schedule information further comprises a description for each of the titles of the currently broadcast and future broadcast television programs, said selecting means comprises means for choosing one of the displayed titles of the second television program guide, and said coupling means comprises means for presenting the description corresponding to the selected title to said display for displaying concurrently with the television program and the corresponding one of said television program guide and said second television program guide.

12. The electronic program guide of claim 11 wherein said coupling means further comprises means for presenting the title of the television program tuned by said tuner to said display when the second television program guide is selectively coupled to said display.

13. The electronic program guide of claim 12 wherein said display comprises a banner for indicating the title of the television program passed by said tuner when the second television program guide is selectively coupled to said display.

14. The electronic program guide of claim 13 wherein said display comprises a cursor to indicate the selected title.

15. The electronic program guide of claim 14 wherein the displayed description includes a background having a first color, said cursor comprises a second color, and said banner comprises a third color, said first color being substantially the same color as the second color and said third color being different from said first and second color.

16. The electronic program guide of claim 5 wherein said coupling means further comprises means for selectively presenting to said display one of said television program guide, said second television program guide, and a third television program guide comprising the titles of the future television programs broadcast at a specific time.

17. The electronic program guide of claim 16 wherein said one channel of the second television program guide is the channel for the last selected title from the last one of said first and third television program guide selectively coupled to said display.

18. The electronic program guide of claim 16 wherein said one channel of the second television program guide is the channel of the television program passed by said tuner.

19. The electronic program guide of claim 16 wherein said selecting means further comprises means for altering the specific time.

20. The electronic program guide of claim 16 wherein the specific time for the third television program is the broadcast time for the last selected title from the last one of said first and second television program guide selectively coupled to said display.

21. The electronic program guide of claim 16 wherein the selectable time for the third television program guide is the starting time of at least one of the currently broadcast television programs.

22. The electronic program guide of claim 16 wherein said display comprises a first prompt having a first color for the second television program guide and a second prompt having a second color for the third television program guide when the television program guide is selectively coupled to said display, said first color being different from said second color, and said coupling means comprising a user input device having a first button comprising substantially the first color for selecting the second television program guide and a second button comprising substantially the second color for selecting the third television program guide.

23. The electronic program guide of claim 16 wherein said display comprises a prompt for the television program guide when the second television program guide is selectively coupled to said display, said prompt having a color, and said coupling means comprising a user input device having a button for selecting the television program guide, said button having a color substantially the same as the color of the prompt.

24. The electronic program guide of claim 16 wherein said display comprises a prompt for the television program guide when the third television program guide is selectively coupled to said display, said prompt having a color, and said coupling means comprising a user input device having a button for selecting the television program guide, said button having a color substantially the same as the color of the prompt.

25. The electronic program guide of claim 1 wherein said television program schedule information further comprises a plurality of titles of television programs for future broadcast, the current and future television programs being formatted into a plurality of categories, and said coupling means further comprises means for selectively presenting to said display one of said television program guide and a second television program guide comprising the titles of the current and future television programs for one of the categories.

26. The electronic program guide of claim 25 wherein said selecting means comprises means for choosing said one of the categories.

27. The electronic program guide of claim 25 wherein said television program schedule information further comprises a description for each of the titles of the currently broadcast and future broadcast television programs, said selecting means further comprises means for choosing one of the displayed titles of the second television program guide, and said coupling means comprises means for presenting the description corresponding to the selected title to said display for displaying concurrently with the television program and the corresponding one of said television program guide and said second television program guide.

28. The electronic program guide of claim 25 wherein said coupling means further comprises means for presenting the title of the television program tuned by said tuner to said display when the second television program guide is selectively coupled to said display.

29. The electronic program guide of claim 28 wherein said display comprises a banner for indicating the title of the television program passed by said tuner when the second television program guide is selectively coupled to said display.

30. The electronic program guide of claim 29 wherein said display comprises a cursor to indicate the selected title.

31. The electronic program guide of claim 30 wherein the displayed description includes a background having a first color, said cursor comprises a second color, and said banner comprises a third color, said first color being substantially the same color as the second color and said third color being different from said first and second color.

32. The electronic program guide of claim 25 wherein said display comprises a prompt for the television program guide when the second television program guide is selectively coupled to said display, said prompt having a color, and said coupling means comprising a user input device having a button for selecting the television program guide, said button having a color substantially the same as the color of the prompt.

33. The electronic program guide of claim 25 wherein said display comprises a prompt for the second television program guide when the television program guide is selectively coupled to said display, said prompt having a color, and said coupling means comprising a user input device having a button for selecting the second television program guide, said button having a color substantially the same as the color of the prompt.

34. A method for processing electronic program guide information, comprising the steps of:
storing television program schedule information comprising a plurality of titles of currently broadcast television programs;
displaying a television program guide comprising at least a portion of the stored titles;
selecting one of the titles from the displayed television program guide;
receiving a television transmission comprising a plurality of television programs;
tuning to the television program corresponding to the selected title from the television program guide; and
displaying the television program concurrently with the television program guide.

35. The method of claim 34 wherein the television program schedule information further comprises a description for each of the titles, and further comprising the step of displaying the description corresponding to the selected title concurrently with the television program and the television program guide.

36. The method of claim 34 wherein the selecting step comprises the step of positioning a cursor over one of the displayed titles.

37. The method of claim 34 wherein said television program schedule information further comprises a plurality of titles of television programs for future broadcast, and further comprising the steps of:
selecting a second television program guide comprising the titles of the future television programs and the current broadcast television program for one channel of the television transmission;
displaying the second television program guide concurrently with the television program; and
selecting one of the displayed titles from the second television program guide.

38. The method of claim 37 wherein said one channel is the channel of the television program tuned by said tuner.

39. The method of claim 37 wherein the second television program guide is displayed in place of the television program guide.

40. The method of claim 39 further comprising the step of displaying the title of the tuned television program.

41. The method of claim 40 further comprising the step of positioning a banner on the title of the tuned television program being displayed.

42. The method of claim 39 wherein said television program schedule information further comprises a description for each of the titles of the currently broadcast and future broadcast television programs, and further comprising the step of displaying the description corresponding to the selected title from the second television program guide concurrently with the television program and the second television program guide.

43. The method of claim 39 further comprising the steps of:
selecting, from the second television program guide, a third television program guide comprising the titles of the future television programs broadcast at a specific time;
displaying the third television program guide in place of the second television program guide concurrently with the television program; and
selecting one of the displayed titles from the third television program guide.

44. The method of claim 43 wherein the specific time is the starting time for the selected title from the second television program guide.

45. The method of claim 44 further comprising the step of altering the specific time.

46. The method of claim 45 further comprising the step of displaying the title of the tuned television program.

47. The method of claim 46 further comprising the step of positioning a banner on the title of the tuned television program being displayed.

48. The method of claim 43 wherein said television program schedule information further comprises a description for each of the titles of the currently broadcast and future broadcast television programs, and further comprising the step of displaying the description corresponding to the selected title from the third television program guide concurrently with the television program and the third television program guide.

49. The method of claim 37 wherein the selecting step comprises the step of positioning a cursor over one of the displayed titles.

50. The method of claim 39 further comprising the step of:
selecting, from the second television program guide, the television program guide;
displaying the television program guide in place of the second program guide concurrently with the television program;
selecting, from the television program guide, a third television program guide comprising the titles of the future television programs broadcast at a specific time, said specific time being the starting time of at least one of the currently broadcast television programs;
displaying the third television program guide in place of the television program guide concurrently with the television program; and
selecting one of the displayed titles from the third television program guide.

51. The method of claim 50 further comprising the step of displaying the title of the tuned television program.

52. The method of claim 51 further comprising the step of positioning a banner on the title of the tuned television program being displayed.

53. The method of claim 50 wherein said television program schedule information further comprises a description for each of the titles of the currently broadcast and future broadcast television programs, and further comprising the step of displaying the description corresponding to the selected title from the third television program guide concurrently with the television program and the third television program guide.

54. The method of claim 50 further comprising the step of altering the specific time.

55. The method of claim 34 wherein said television program schedule information further comprises a plurality of titles of television programs for future broadcast, the current and future television programs being formatted into a plurality of categories, and further comprising the steps of:
selecting a fourth television program guide comprising the titles of the current and future television programs for one of the categories;
displaying the fourth television program guide concurrently with the television program; and
selecting one of the displayed titles from the fourth television program guide.

56. The method of claim 55 further comprising the step of selecting one of the categories.

57. The method of claim 55 wherein the fourth television program guide is displayed in place of the television program guide.

58. The method of claim 55 further comprising the step of displaying the title of the tuned television program.

59. The method of claim 58 further comprising the step of positioning a banner on the title of the tuned television program being displayed.

60. The method of claim 55 wherein said television program schedule information further comprises a description for each of the titles of the currently broadcast and future broadcast television programs, and further comprising the step of displaying the description corresponding to the selected title from the fourth television program guide concurrently with the television program and the fourth television program guide.

61. An electronic program guide (EPG) comprising:
a monitor having a display screen;
a memory in which is stored current television program listings including title and channel;
a television channel selector set to receive a given television channel;
means in a television mode for displaying on the screen the program on the given channel full screen;
means in an EPG mode for displaying some of the stored program listings in a first area of the screen and displaying a television program in a second area of the screen;
means for highlighting one of the displayed listings in the EPG mode with a cursor;
means for moving the cursor in the EPG mode to select a desired listing;
means responsive to a surf command in the EPG mode to change the channel selector to the channel corresponding to the highlighted program listing as the cursor moves and thus display the highlighted program in the second area; and
means responsive to a scan command in the EPG mode to keep the channel selector set at the given channel as the cursor moves and thus leave the program displayed in the second area unchanged as the cursor moves.

62. The EPG of claim 61, additionally comprising means in the EPG mode for displaying on the screen a textual description of the program highlighted by the cursor, thereby changing the description as the cursor moves.

63. The EPG of claim 61, in which the memory also stores future program listings, the EPG additionally comprising means responsive to a record command in the EPG mode for automatically recording the program highlighted by the cursor.

64. The EPG of claim 61, in which the memory also stores future program listings, the EPG additionally comprising means responsive to a watch command in the EPG mode for automatically displaying on the screen in the television mode the program highlighted by the cursor.

65. The EPG of claim 61, in which the stored program listings consist of a data base of all the programs on specified channels during a specified time period and the displaying means in the EPG mode replaces some of the program listings displayed in the first area with other program listings as the cursor moves to highlight program listings near the edge of the screen so that the entire data base can be displayed on the screen.

* * * * *